US012780306B2

(12) United States Patent
Deixler et al.

(10) Patent No.: US 12,780,306 B2
(45) Date of Patent: Nov. 3, 2026

(54) WHEEL SUSPENSION SYSTEM FOR A VEHICLE WHEEL OF A MOTOR VEHICLE, AND MOTOR VEHICLE

(71) Applicant: Bayerische Motoren Werke Aktiengesellschaft, Munich (DE)

(72) Inventors: Norbert Deixler, Schoerfling am Attersee (AT); Sebastian Gielisch, Unterschleissheim (DE); Martin Waldmann, Tutzing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 19/118,402

(22) PCT Filed: Oct. 4, 2023

(86) PCT No.: PCT/EP2023/077369
§ 371 (c)(1),
(2) Date: Apr. 4, 2025

(87) PCT Pub. No.: WO2024/074520
PCT Pub. Date: Apr. 11, 2024

(65) Prior Publication Data

US 2026/0125110 A1 May 7, 2026

(30) Foreign Application Priority Data

Oct. 4, 2022 (DE) ..................... 10 2022 125 520.4

(51) Int. Cl.
*B60G 7/00* (2006.01)
*B62D 7/20* (2006.01)

(52) U.S. Cl.
CPC ............... *B62D 7/20* (2013.01); *B60G 7/001* (2013.01)

(58) Field of Classification Search
CPC .................................. B62D 7/20; B60G 7/001
See application file for complete search history.

(56) References Cited

U.S. PATENT DOCUMENTS 5,507,510 A * 4/1996 Kami ........................ B60G 3/26 280/124.136
2018/0037079 A1 * 2/2018 Langhoff ............... B60G 15/04
(Continued)

FOREIGN PATENT DOCUMENTS

DE 37 18 137 A1 12/1988
DE 10133424 A1 * 1/2003 ............... B60G 3/26
(Continued)

OTHER PUBLICATIONS

International Search Report (PCT/ISA/210) issued in PCT Application No. PCT/EP2023/077369 dated Dec. 14, 2023 with English translation (6 pages).

(Continued)

*Primary Examiner* — Nicole T Verley
(74) *Attorney, Agent, or Firm* — Omar A. Galiano

(57) ABSTRACT

A wheel suspension system for a vehicle wheel of a motor vehicle, with a wheel support, and with a steering knuckle, on which the vehicle wheel can be mounted pivotably, wherein, in order to steer the pivot bearing and the vehicle wheel, the pivot bearing is mounted on the wheel support pivotably about a pivot axis relative to the wheel support. At least two wheel links which are coupled in an articulated manner to the wheel support are provided, including a first wheel link and a second wheel link, via which the wheel support can be attached in an articulated manner to a chassis of the motor vehicle. A third wheel link which is coupled in an articulated manner to the pivot bearing via a rubber bearing is provided, via which third wheel link the pivot bearing can be pivoted about the pivot axis relative to the (Continued)

wheel support to steer the pivot bearing and the vehicle wheel.

19 Claims, 11 Drawing Sheets

(56) References Cited

U.S. PATENT DOCUMENTS

2020/0079167 A1* 3/2020 Brenner .................... B62D 7/06
2022/0153076 A1 5/2022 Friesen et al.

FOREIGN PATENT DOCUMENTS

| | | | | | |
|---|---|---|---|---|---|
| DE | 10 2014 226 225 | A1 | | 6/2016 | |
| DE | 102016217610 | A1 | * | 3/2018 | ............... B60G 7/02 |
| DE | 10 2019 202 185 | A1 | | 8/2020 | |
| DE | 102012102436 | B4 | * | 5/2025 | ............. B60G 7/001 |
| EP | 0141093 | B1 | * | 9/1987 | ............... B60G 3/20 |
| EP | 806310 | A2 | * | 11/1997 | |
| EP | 0 825 040 | A2 | | 2/1998 | |
| EP | 878378 | A1 | * | 11/1998 | |
| ES | 2163675 | T3 | * | 2/2002 | ............. B60G 11/27 |
| GB | 258771 | A | | 7/2018 | |
| GB | 2558771 | A | * | 7/2018 | ............. B62D 7/146 |
| GB | 2582330 | A | | 9/2020 | |
| WO | WO 2015/144482 | A1 | | 10/2015 | |
| WO | WO-2018050342 | A1 | * | 3/2018 | ............... B60G 7/02 |
| WO | WO-2021094039 | A1 | * | 5/2021 | ............. B60G 11/27 |
| WO | WO-2025191094 | A1 | * | 9/2025 | ............... B60G 3/20 |
| WO | WO-2025242451 | A1 | * | 11/2025 | ............. B60G 7/008 |

OTHER PUBLICATIONS

German-language Written Opinion (PCT/ISA/237) issued in PCT Application No. PCT/EP2023/077369 dated Dec. 14, 2023 with English translation (12 pages).

* cited by examiner

WHEEL SUSPENSION SYSTEM FOR A VEHICLE WHEEL OF A MOTOR VEHICLE, AND MOTOR VEHICLE

BACKGROUND AND SUMMARY

The invention relates to a wheel suspension for, in particular precisely, a vehicle wheel of a motor vehicle according to the preamble of the independent claim. Furthermore, the invention relates to a motor vehicle having at least one such wheel suspension.

DE 102014226225 A1 discloses a wheel suspension arrangement of an axle arrangement for a vehicle as known. In addition, WO 2015/144482 A1 discloses a steering device for a motor vehicle for pivoting at least one steerable vehicle wheel which is spring-mounted on a suspension relative to a chassis of the motor vehicle, wherein the steerable vehicle wheel is rotatably mounted on an axle leg, and the steering knuckle is mounted rotatably about a pivot axis in at least one pivot position on the suspension.

An object of the present invention is to provide a wheel suspension for, in particular precisely, a vehicle wheel of a motor vehicle and a motor vehicle having at least one such wheel suspension, so that particularly high driving comfort and a particularly large steering angle of the vehicle wheel can be realized.

This object is achieved according to the invention by a wheel suspension having the features of the independent claim and by a motor vehicle having the features of the wheel suspension. Advantageous embodiments of the invention are the subject matter of the dependent claims.

The first aspect of the invention relates to a wheel suspension for, in particular precisely, a vehicle wheel of a motor vehicle which is simply also referred to as a vehicle and is preferably designed as a passenger car. This means that, via the wheel suspension according to the first aspect of the invention, at least or preferably precisely one vehicle wheel, namely the aforementioned motor vehicle, also referred to as a motor vehicle, can be connected in an articulated manner to a chassis of the motor vehicle. This means that, in its completely produced state, the motor vehicle has the wheel suspension and the vehicle wheel, which, in the completely produced state of the motor vehicle, is connected to the chassis in an articulated manner via the wheel suspension, that is to say is coupled to the chassis. Thus, in its fully manufactured state, the motor vehicle also has the chassis. For example, in its completely produced state, the motor vehicle has a structure which delimits a passenger compartment of the motor vehicle, also referred to as a passenger compartment or passenger compartment. It is conceivable that the structure is the chassis in particular when the structure is designed as a self-supporting body. Furthermore, it is conceivable that the chassis is formed separately from the structure and is held on the structure, in particular in such a way that the chassis, in particular elastically, is mounted on the structure or vice versa. The chassis can be a frame, in particular a lead frame, or an axle support. In particular, the structure can be a self-supporting body, wherein here, for example, the chassis designed as an axle support can be used, which can be mounted, in particular elastically, on the structure.

During travel of the motor vehicle, people such as, for example, the driver, can be inside the interior. The feature that the vehicle wheel can be connected or connected in an articulated manner to the chassis via the wheel suspension or by means of the wheel suspension is to be understood in particular to mean that the wheel suspension can be coupled in an articulated manner directly to the chassis or to the structure. In particular, for example, the wheel suspension is connected to the chassis or the structure in an articulated manner, in particular directly, in an articulated manner, that is to say coupled to the chassis or the structure. The vehicle wheel is a ground contact element of the motor vehicle, which is supported or supported on a floor via the ground contact element in the vehicle vertical direction of the motor vehicle. If the motor vehicle is driven along the ground, while the motor vehicle, also referred to as a vehicle, is supported on the ground in the vertical direction of the vehicle in the vertical direction of the motor vehicle, the vehicle wheel is rolled, in particular directly, on the ground.

The wheel suspension has a wheel holder. In principle, it is conceivable that the wheel holder is formed in one piece, that is to say it is formed from a single piece. In other words, it is preferably envisaged that the wheel holder is not composed, for example, of a plurality of parts which are formed separately from one another and are connected to one another, but preferably the wheel holder is formed from a single piece and is thus formed as a monoblock or formed by a monoblock. The wheel suspension also has a pivot bearing envisaged in particular in addition to the wheel holder and in particular formed separately from the wheel holder. The pivot bearing is a component which is envisaged in particular in addition to the wheel holder and is in particular formed separately from the wheel holder. For example, the pivot bearing can be formed in one piece, thus formed from a single piece. The vehicle wheel is rotatably mounted or mounted on the pivot bearing, in particular about a wheel rotation axis, relative to the pivot bearing and preferably also relative to the wheel holder. For this purpose, for example, a wheel hub, in particular via at least or exactly one rolling bearing, is mounted or mounted rotatably about the wheel rotation axis on the pivot bearing relative to the pivot bearing. The vehicle wheel can, for example, be connected or connected to the wheel hub in a rotationally fixed manner, so that the wheel hub and in particular with it the vehicle wheel can rotate together about the wheel rotation axis relative to the pivot bearing. In order to steer the pivot bearing and thus of the vehicle wheel, the pivot bearing is mounted on the wheel holder so as to be pivotable about a pivot axis extending in particular perpendicularly or obliquely with respect to the wheel rotational axis, also referred to as a steering axis, relative to the wheel holder. In other words, the pivot bearing is mounted on the wheel holder so as to be pivotable about the pivot axis relative to the wheel holder, so that, in the completely produced state of the motor vehicle, the pivot bearing and therewith the vehicle wheel can be pivoted about the pivot axis relative to the wheel holder and can thereby be steered. This means in particular that pivoting and thus steering of the pivot bearing and thus of the vehicle wheel of the motor vehicle can be steered by pivoting and thus steering the pivot bearing and thus of the vehicle wheel, which can be effected about the pivot axis and relative to the wheel holder, for example cornering, changes in the direction of travel and/or a change in the lane of the motor vehicle can be effected. For this purpose, for example, a steering handle designed in particular as a steering wheel is envisaged in the interior, which is rotatable, for example, about a steering wheel rotation axis relative to the structure. The driver's cab or the driver can actuate the steering wheel and thereby rotate about the steering wheel rotation axis relative to the body, as a result of which the pivot bearing and therewith the vehicle wheel can be pivoted about the pivot axis relative to the wheel holder, in order thereby to be able to steer the pivot bearing and the vehicle wheel and thus the motor vehicle, and therefore to be able to effect the aforementioned changes in the direction of travel, lane change and/or cornering of the motor vehicle. For example, the steering handle is mechanically coupled to the pivot bearing.

The feature that, for example, the wheel rotational axis extends obliquely or perpendicular to the pivot axis is to be understood to mean that the wheel rotation axis runs perpendicular to a first plane and the pivot axis runs perpendicular to a second plane, wherein the planes run obliquely or perpendicularly to one another.

In the fully produced state of the motor vehicle, the wheel suspension is, for example, a component of a vehicle axle of the motor vehicle, also referred to simply as an axle. In this case, the vehicle axle comprises, for example, the wheel suspension and the vehicle wheel. The wheel suspension is also referred to as a first wheel suspension, the vehicle wheel is also referred to as a first vehicle wheel. In the following, if reference is made to the wheel suspension, the first wheel suspension should be understood, unless otherwise indicated. In the following, if mention is made of the vehicle wheel, the first vehicle wheel is to be understood, unless otherwise indicated. For example, the vehicle axle has at least or exactly two wheel suspensions, namely the first wheel suspension and at least or exactly one second wheel suspension, wherein the previous and following statements relating to the first wheel suspension can readily also be transferred to the second wheel suspension and vice versa. Furthermore, it is conceivable that the vehicle axle has at least or exactly two vehicle wheels, namely the first vehicle wheel and at least or exactly one additional, second vehicle wheel, wherein the previous and following statements relating to the first vehicle wheel can also be applied to the second vehicle wheel without difficulty and vice versa. In this case, the first wheel suspension is assigned to the first vehicle wheel, so that the first vehicle wheel can be connected or can be attached to the chassis or to the structure in an articulated manner via the first wheel suspension. The second wheel suspension is assigned to the second vehicle wheel, which is connectable or connected in an articulated manner to the chassis or to the structure via the second wheel suspension.

In particular, the vehicle axle also referred to as the axle is a rear axle or else a front axle. In particular, the vehicle axle is a drivable vehicle axle, also referred to as a driven axle, the vehicle wheels of which can be driven, in particular, by means of a drive device of the motor vehicle, in order thereby to drive the motor vehicle as a whole and thereby travel, for example, along the aforementioned ground. The drive device can have an internal combustion engine and/or an electric motor.

In order, on the one hand, to achieve particularly high driving comfort for persons in the interior and, on the other hand, a particularly large steering angle about which the vehicle wheel can be pivoted about the pivot axis relative to the wheel holder and can thereby be steered, so that, for example, a particularly small turning circle of the motor vehicle can be realized, it is envisaged according to the invention that the wheel suspension has at least two check rails which are coupled in an articulated manner to the wheel holder, namely a first check rail and a second check rail. The respective check rail is also simply referred to as a link or wheel guide link. The wheel holder is attachable or attached to the chassis of the motor vehicle in an articulated manner via the first check rail and the second check rail. In particular, the first check rail and the second check rail are coupled to the wheel holder in an articulated manner, bypassing the pivot bearing, that is to say not via the pivot bearing, so that, for example, a force can be transmitted or transmitted from the wheel holder to the first check rail or the second check rail along a first force path such that the pivot bearing is not arranged in the first force path between the wheel holder and the first check rail or the second check rail. Thus, the previously mentioned force, also referred to as the first force, does not flow over the pivot bearing on its path from the wheel holder along the first force path to the first or second check rail. By means of the first check rail and the second check rail, the wheel holder and thus, in particular, via the pivot bearing, the vehicle wheel can also be guided or guided relative to the chassis, in particular in such a way that the first check rail and the second check rail at least limit or avoid first relative movements between the wheel holder and the chassis, for example, along at least one first direction of movement, and in particular permit relative movements between the wheel holder and the chassis that take place along at least one second direction of movement. The second set of relative movements between the wheel holder and the chassis and thus the second of the vehicle wheel and the chassis, which take place along the second direction of movement, are, for example, retraction and rebound movements of the vehicle wheel and thus of the wheel holder, wherein the vehicle wheel moves at least substantially in the vertical direction of the vehicle relative to the chassis or structure during the retraction and rebound movements. The retraction and rebound movements are also referred to as wheel movements. Thus, for example, the second direction of movement runs at least substantially in the vertical direction of the vehicle. The wheel movements occur, for example, when the vehicle wheel rolls over an unevenness of the ground while the motor vehicle is being driven along a ground. An elevation of the base leads, for example, to a spring-in movement of the vehicle wheel, and a recess such as, for example, a pothole in the ground leads, for example, to a spring-out movement of the vehicle wheel. During the respective one-spring movement, for example, the wheel holder and therewith the pivot bearing and the vehicle wheel move in the vertical direction of the vehicle upward relative to the chassis, and during the respective rebound movement, for example, the wheel holder and therewith the pivot bearing and the vehicle wheel move downwards in the vertical direction of the vehicle relative to the chassis. A spring and/or damper element is envisaged, for example, by means of which the wheel holder and thus the vehicle wheel can be supported or supported on the chassis, in particular with regard to the wheel movements.

According to the invention, the wheel suspension furthermore has, in particular at least or exactly, a third check rail which is coupled in an articulated manner to the pivot bearing via, in particular at least or exactly, a connecting element, by bypassing the wheel holder, which is also referred to as a tie rod, for example. In particular, it is conceivable that a track, in particular a toe-in, of the vehicle wheel is adjustable, that is to say variable, by means of the third wheel control arm for steering the pivot bearing and thus of the vehicle wheel, in particular by moving the third wheel control arm relative to the wheel holder and in particular also relative to the chassis, the pivot bearing and therewith the vehicle wheel are pivoted about the pivot axis relative to the wheel holder. In other words, in order, for example, to pivot the pivot bearing about the pivot axis relative to the wheel holder, and therefore to pivot the pivot bearing and therewith the vehicle wheel relative to the wheel holder about the pivot axis and thus to steer, the third check rail is moved, for example, at least or exclusively translationally relative to the wheel holder and in particular also relative to the chassis, and consequently displaced. Thus, for example, the aforementioned steering handle is coupled to the pivot bearing, in particular mechanically, via the third check rail, so that by rotating the steering wheel about the steering wheel rotation axis and relative to the structure, for example, the third check rail can be displaced relative to the wheel holder and, as a result, the pivot bearing can be pivoted about the pivot axis relative to the wheel holder.

The connecting element is preferably a rubber bearing or a joint, such as a sliding joint and/or a ball joint. The connecting element is to be understood in particular as a component which is envisaged in addition to the pivot bearing and in addition to the third check rails, and therefore has at least one plurality of components envisaged in addition to the pivot bearing and the third check rail, wherein the component couples the pivot bearing to the third check rail in an articulated manner, so that the pivot bearing and the third check rail are coupled to one another so as to be movable relative to one another. If, for example, a load such as, for example, a force acts on the pivot bearing, the load can be transmitted from the pivot bearing via the connecting element to the third check rail or vice versa, so that, for example, the connecting element is arranged in the force transmission path between the pivot bearing and the third check rail in relation to a force transmission path over which loads such as, for example, forces and/or torques can be transmitted from the pivot bearing to the third check rail.

The feature that the third check rail is preferably coupled to the pivot bearing in an articulated manner while bypassing the wheel holder means the third check rail is not coupled to the pivot bearing in an articulated manner via the wheel holder, so that, for example, a second force can be transmitted or transmitted from the pivot bearing to the third check rail along a second force path, wherein the second force path runs such that the wheel holder is not arranged in the second force path between the pivot bearing and the third check rail. Thus, the second force runs, flows or streams on its path from the pivot bearing along the second force path to the third check rail or links not via the wheel holder. The second force therefore bypasses the wheel holder on its path from the pivot bearing to the third check rail or links. Accordingly, it is envisaged, for example, that the aforementioned first force on its path from the wheel holder along the first force path to the first or second check rail bypasses the pivot bearing, and therefore does not extend over the pivot bearing. The third check rail is also envisaged or designed for guiding the pivot bearing and thus of the vehicle wheel, so that the third check rail is referred to as a guide link or wheel guide link. It is thus envisaged, for example, that the first relative movements mentioned above are at least limited or prevented by means of the third check rail, wherein, for example, the third check rail allows the second relative movements in a targeted manner. Overall, it can be seen that the wheel holder, the pivot bearing and the vehicle wheel jointly execute the wheel movements, that is to say the wheel movements take place relative to the chassis, so that the wheel movements are permitted by the first check rail, by the second check rail and by the third check rail, in particular in a targeted manner. However, the wheel holder does not also make pivoting movements about the pivot axis, also referred to as steering movements, with the result that, in relation to the wheel holder, the pivot bearing and the vehicle wheel, only the pivot bearing and the vehicle wheel move about the pivot axis relative to the wheel holder pivot movements together. Thus, with regard to the steering movements, the pivot bearing and the vehicle wheel are decoupled from the wheel holder. Since, in the invention, at least the first check rail, the second check rail and the third check rail are used to guide the vehicle wheel relative to the chassis, the vehicle axle can be designed as a multi-link axle, as a result of which a particularly high driving comfort can be achieved. In addition, particularly high driving comfort can be realized, in particular, in that the third check rail is coupled in an articulated manner to the pivot bearing via the aforementioned connecting element, also referred to as a first connecting element and designed, for example, as a rubber bearing or ball joint.

Furthermore, it is conceivable that a motor, in particular an electric motor, is assigned to the pivot bearing and thus to the third check rail. By means of the motor, for example, the check rail can be driven and thereby displaced relative to the wheel holder, and consequently moved translationally, as a result of which the pivot bearing can be pivoted about the pivot axis relative to the wheel holder via the third check rail by the motor. It is thus conceivable that a steering, which comprises the third check rail and for example also the pivot bearing, is designed, for example, as a rear axle steering system, as a steer-by-wire steering system, so that the steering system does not have a mechanical coupling to the steering handle.

According to the invention, a spring and/or damper element is also envisaged, via which the wheel holder and the pivot bearing and thus the vehicle wheel is supported or supported in a sprung and/or damped manner on the body of the motor vehicle.

The spring and/or damper element can be coupled, in an articulated manner and thus, for example, via at least or exactly one joint, indirectly or directly to the wheel holder, while bypassing the pivot bearing. This is to be understood as follows: The spring and/or damper element can be coupled to the wheel holder in an articulated manner via, in particular precisely, a joint, in particular while bypassing the pivot bearing and preferably bypassing the only or all check rails of the wheel suspension. The spring and/or damper element would then be coupled directly to the wheel holder via the joint. Furthermore, it is conceivable that the spring and/or damper element is coupled in an articulated manner to, in particular precisely, one of the check rails via, in particular precisely one joint, in particular by bypassing the pivot bearing, the wheel holder and the or all other check rails of the wheel suspension. The spring and/or the damper element is coupled in an articulated and indirect manner to the wheel holder. In other words, the feature that, for example, the spring and/or damper element is coupled in an articulated manner and thus, for example, via at least or exactly one joint and indirectly to the wheel holder, means that the spring and/or damper element is coupled in an articulated manner and thus via the at least or exactly one joint to one of the check rails, to be precise by bypassing the wheel holder, the pivot bearing and the only or all other check rails, so that the spring and/or damper element is coupled to the wheel holder in an articulated manner via the one check rail, that is to say by means of the one check rail. Thus, for example, a force is transmitted along a transmission path from the wheel holder to the spring and/or damper element in such a way that the transmission path and thus the force from the wheel holder to the one check rail and from one check rail to the spring and/or damper element runs. This means that the force is transmitted from the wheel holder to the spring and/or damper element via the one check rail. In this case, the force on its path from the wheel holder to the spring and/or damper element bypasses the pivot bearing and the remaining check rails, and consequently the force on its path from the wheel holder to the spring and/or damper element does not flow via the pivot bearing and not via the remaining check rails. The one check rail is thus arranged in the transmission path downstream of the wheel holder and upstream of the spring and/or damper element, thus between the wheel holder and the spring and/or damper element. The pivot bearing and the remaining check rails are not arranged in the transmission path between the wheel holder and the spring and/or damper element. The pivot bearing can be arranged in the transmission path, but not between the wheel holder and the spring and/or damper element, but in particular upstream of the wheel holder, in such a way that, for example, the force is transmitted from the pivot bearing to the wheel holder and from the latter to the one check rail and from the latter, in particular while bypassing the only or all other check rails, to the spring and/or damper element.

The feature that, for example, the spring and/or damper element is articulated and thus coupled, for example, via at least or exactly one joint and directly to the wheel holder, means the spring and/or damper element is coupled in an articulated manner and thus via the at least or exactly one joint to the wheel holder, while bypassing the pivot bearing and the or all other check rails. Thus, the aforementioned transmission path and thus the force from the wheel holder to the spring and/or damper element extend in such a way that the transmission path and thus the force from the wheel holder extend to or onto the spring and/or damper element. In this case, the force on its path from the wheel holder to the spring and/or damper element is the pivot bearing and the or all check rails of the wheel suspension, and consequently the force on its path from the wheel holder to the spring and/or damper element does not flow via the pivot bearing and not via the check rails. The pivot bearing and the check rails are therefore not arranged in the transmission path between the wheel holder and the spring and/or damper element. The pivot bearing can be arranged in the transmission path, but not between the wheel holder and the spring and/or damper element, but in particular upstream of the wheel holder, in such a way that, for example, the force is transmitted from the pivot bearing to the wheel holder and from the latter, in particular while bypassing the or all check rails of the wheel suspension, to the spring and/or damper element.

The spring and/or damper element can have or be at least one spring, which can also be referred to as a support spring. The spring is designed, for example, as a mechanical spring, consequently as a solid body, and can be designed, for example, as a helical spring. The spring can be formed, for example, from a metallic material, in particular steel, or from a fiber-reinforced plastic. Alternatively, the spring can be designed as an air spring. For example, the spring is tensioned during the respective wheel movement, as a result of which the spring provides a spring force opposing the respective wheel movement. Alternatively or in addition to the spring, the spring and/or damper element can comprise or be at least one vibration damper for damping the respective wheel movement, wherein the vibration element is also referred to as a shock absorber and can preferably be designed as a hydraulic shock absorber. If the spring and/or damper element comprises both the spring and the vibration damper, it is possible for the spring and the vibration damper to be coupled, in particular in an articulated manner and thus, for example, via at least or exactly one joint, to the wheel holder, in particular by bypassing the or all check rails of the wheel suspension and of the pivot bearing, or to the same check rail, in particular by bypassing the pivot bearing and the wheel holder and the or all remaining check rails of the wheel suspension, or it is conceivable:

The spring can be coupled, in particular in an articulated manner and thus, for example, via at least or exactly one joint, to the wheel holder, in particular by bypassing the or all check rails of the wheel suspension and of the pivot bearing, wherein the vibration damper is, for example, in particular articulated and thus, for example, via at least or exactly one joint, with one of the check rails, in particular while bypassing the wheel holder and the pivot bearing and the or all remaining wheel arms of the wheel suspension.

The vibration damper can be coupled, in particular in an articulated manner and thus, for example, via at least or exactly one joint, to the wheel holder, in particular by bypassing the check rails and the pivot bearing, wherein the spring can be coupled, for example, in particular in an articulated manner and thus for example via at least or exactly one joint, to one of the check rails, in particular by bypassing the wheel holder and the pivot bearing and the or all remaining wheel arms of the wheel suspension.

The vibration damper can be coupled, in particular in an articulated manner and thus, for example, via at least or exactly one joint, to one of the check rails, in particular by bypassing the check rails and the pivot bearing and the or all remaining check rails of the wheel suspension, wherein the spring can be coupled, for example, in particular in an articulated manner and thus, for example, via at least or exactly one joint, to another of the check rails, in particular by bypassing the wheel holder and the pivot bearing and the or all remaining check rails of the wheel suspension.

To be able to realize a particularly high driving comfort and a particularly large steering angle, it is envisaged in one embodiment of the invention that the third check rail is coupled in an articulated manner to the pivot bearing via precisely one mounting point comprising the connecting element, that is to say via a single mounting point comprising the connecting element. Thus, the third check rail is preferably designed as a rod link or as a two-point link, which preferably has exactly two coupling points, namely the aforementioned mounting point comprising the first connecting element as the first of the coupling points and a second coupling point, on or by means of which, for example, the third check rail can be coupled or coupled to the steering handle or to the motor.

To keep the number of parts, the space required and the weight of the wheel suspension particularly low and to realize particularly high driving comfort, it is envisaged in a further embodiment of the invention that the second check rail is designed as a four-point rocker. The four-point rocker is coupled to the wheel holder in an articulated manner via exactly two first mounting points which are spaced apart from one another, in particular while bypassing the pivot bearing. For example, the first Mounting points in each case, precisely, have a connecting element designed, for example, as a rubber bearing or ball joint, via which the four-point rocker is coupled in an articulated manner to the wheel holder. The connecting elements of the first mounting points are preferably spaced apart from one another. Furthermore, the four-point rocker has exactly two second mounting points which are spaced apart from one another and by means of which the four-point rocker can be coupled or coupled to the chassis in an articulated manner, while bypassing the pivot bearing. In this case, for example, the second mounting points each have, precisely, a connecting element designed, for example, as a rubber bearing or ball joint, via which the four-point rocker can be coupled or coupled in an articulated manner to the chassis. The connecting elements of the second mounting points are preferably spaced apart from one another. It is thus preferably envisaged that the four-point rocker can be coupled or coupled to the chassis in an articulated manner via exactly two second mounting points, which each have, precisely, a connecting element designed, for example, as a rubber bearing or ball joint.

To realize a particularly high driving comfort, in a further embodiment it has been shown to be particularly advantageous if the second check rail is designed as a three-point rocker which is coupled to the wheel holder in an articulated manner via exactly one first mounting point, while bypassing the pivot bearing. Furthermore, the three-point rocker preferably has exactly two second mounting points which are spaced apart from one another and by means of which the three-point rocker can be coupled or coupled to the chassis in an articulated manner, while bypassing the pivot bearing. The respective mounting point preferably has, precisely, a connecting element designed, for example, as a rubber bearing or ball joint, via which the three-point rocker is coupled or coupled in an articulated manner to the wheel holder or is coupled to the chassis in an articulated manner. In this way, a particularly high driving comfort can be represented.

In order to avoid undesired relative movements and thus to be able to realize a particularly high driving comfort, it is envisaged in a further embodiment of the invention that the wheel suspension has a pendulum support, also referred to as a first pendulum support, which is coupled to the wheel holder in an articulated manner via, in particular precisely, a third mounting point, which is spaced apart from the first mounting point and from the second mounting points and, for example, in particular exactly, a connecting element designed, for example, as a rubber bearing or ball joint, is coupled to the wheel holder in an articulated manner, in particular precisely, in particular exactly, having a connecting element designed, for example, as a rubber bearing or ball joint.

It has been shown to be particularly advantageous if the wheel suspension has a second pendulum support envisaged in addition to the first pendulum support. The second pendulum support is coupled to the wheel holder in an articulated manner via, in particular precisely, a fifth mounting point, which is spaced apart from the first mounting point, from the second mounting point, from the third mounting point and from the fourth mounting point, for example, in particular exactly, and has, for example, a connecting element designed as a rubber bearing or ball joint, in particular while bypassing the pivot bearing. In addition, the second pendulum support is coupled in an articulated manner to the first check rail via, in particular precisely, a sixth mounting point spaced apart from the first mounting point, from the second mounting points, from the third mounting point, from the fourth mounting point and from the fifth mounting point and, for example, in particular precisely, a connecting element designed, for example, as a rubber bearing or ball joint, in particular while bypassing the wheel holder and bypassing the pivot bearing. As a result, undesired relative movements can be avoided, as a result of which a particularly high driving comfort can be achieved.

In an alternative embodiment, a pendulum support is envisaged, which is coupled in an articulated manner to the wheel holder via, in particular precisely, a third mounting point which is spaced apart from the first mounting point and from the second mounting points, in particular precisely, a connecting element designed, for example, as a rubber bearing or ball joint, and is coupled to the first check rail in an articulated manner, in particular precisely, a fourth mounting point, for example, having a connecting element designed as a rubber bearing or ball joint, for example, having a connecting element in the form of a rubber bearing or ball joint.

A further, alternative embodiment is characterized in that, in particular while bypassing the pivot bearing, at least four check rails are coupled in an articulated manner to the wheel holder, namely the first check rail, the second check rail, a fourth check rail and a fifth check rail. Via the first check rail, the second check rail, the fourth check rail and the fifth check rail, while bypassing the pivot bearing, it can be connected or attached in an articulated manner to the chassis of the motor vehicle. As a result, undesired relative movements can be avoided in a particularly defined manner, so that particularly high driving comfort can be achieved.

It has been shown to be particularly advantageous if the wheel suspension has a pendulum support which is envisaged in particular in addition to the check rails and which is coupled to the wheel holder in an articulated manner via, in particular precisely, a first mounting point having, for example, in particular precisely, a connecting element designed, for example, as a rubber bearing or ball joint, in particular while bypassing the pivot bearing. In addition, the pendulum support is coupled in an articulated manner via, in particular precisely, a second mounting point, which is spaced apart from the first mounting point, for example, in particular exactly, a connecting element designed, for example, as a rubber bearing or ball joint, to one of the four check rails coupled in an articulated manner to the wheel holder, in particular to the first check rail, in particular while bypassing the pivot bearing and the wheel holder. As a result, a particularly precise and thus defined guidance of the vehicle wheel, also referred to as a wheel guide, can be realized, relative to the chassis or relative to the structure.

A further embodiment is characterized by the fact that the second check rail is coupled in an articulated manner to the wheel holder via precisely one third mounting point, for example having exactly one connecting element designed, for example, as a rubber bearing or ball joint, while bypassing the pivot bearing. The second check rail preferably has exactly one fourth mounting point spaced apart from the third mounting point, by means of which fourth mounting point the second check rail can be coupled or coupled in an articulated manner to the chassis, so that preferably the second check rail can be coupled or coupled to the chassis in an articulated manner via precisely one mounting point spaced apart from the third mounting point, namely the fourth mounting point, while bypassing the wheel holder and the pivot bearing. As an alternative or in addition, the fourth check rail is coupled to the wheel holder in an articulated manner via precisely one fifth mounting point, which has, for example, precisely, a connecting element designed, for example, as a rubber bearing or ball joint, in particular while bypassing the pivot bearing. Furthermore, it is preferably envisaged that the fourth check rail has exactly one sixth mounting point which is spaced apart from the fifth mounting point and by means of which the fourth check rail can be coupled or coupled in an articulated manner to the chassis. In other words, for example, the fourth check rail can be coupled or coupled to the chassis in an articulated manner via exactly one mounting point, for example, exactly, a connecting element designed, for example, as a rubber bearing or ball joint, namely the sixth mounting point, while bypassing the wheel holder and the pivot bearing. The third mounting point and/or the fourth mounting point and/or the fifth mounting point and/or the sixth mounting point can have, precisely, a connecting element designed, for example, as a rubber bearing or ball joint.

As an alternative or in addition, the fifth check rail is coupled in an articulated manner to the wheel holder via precisely one seventh mounting point having, for example, precisely, a connecting element designed, for example, as a rubber bearing or ball joint, in particular while bypassing the pivot bearing. The fifth check rail preferably has exactly one eighth mounting point which is spaced apart from the seventh mounting point and by means of which the fifth check rail can be coupled or is coupled in an articulated manner to the chassis, wherein the eighth mounting point has, for example, in particular precisely, a connecting element designed, for example, as a rubber bearing or ball joint. In other words, it is preferably envisaged that the fifth check rail can be coupled or coupled to the chassis in an articulated manner via precisely one mounting point, namely the eighth mounting point, which is designed for example as a rubber bearing or ball joint, namely the eighth mounting point, in particular while bypassing the wheel holder and the pivot bearing. In other words, it is preferably envisaged that the second check rail and/or the fourth check rail and/or the fifth check rail is designed as a rod link, consequently as a two-point link, which has exactly two coupling points, namely the respective mentioned mounting points, wherein the respective rod link is coupled or coupled in an articulated manner to the wheel holder via the coupling points, in particular by bypassing the pivot bearing, and can be coupled or coupled in an articulated manner to the chassis, in particular by bypassing the pivot bearing and the wheel holder. As a result, a particularly precise guidance of the vehicle wheel can be represented in a space-saving, weight- and cost-effective manner.

In a further, particularly advantageous embodiment of the invention, it is envisaged that the first check rail has exactly one mounting point, for example, in particular exactly, which has a connecting element designed, for example, as a rubber bearing or ball joint, by means of which mounting point the first check rail can be coupled or coupled in an articulated manner to the chassis, in particular while bypassing the wheel holder and the pivot bearing. As a result, particularly precise wheel guidance and thus particularly high driving comfort can be represented in a space-saving and cost-effective manner.

In a further, particularly advantageous embodiment of the invention, it is envisaged that the first check rail is coupled to the wheel holder in an articulated manner via precisely one mounting point, which has, for example, precisely, a connecting element designed, for example, as a rubber bearing or ball joint, in particular while bypassing the pivot bearing. Thus, the first check rail is preferably designed as a rod link, thus as a two-point link, so that a particularly precise and space-favorable wheel guidance can be produced.

In order to realize a particularly precise wheel guidance, i.e. to be able to reliably avoid undesired relative movements, so that a particularly high driving comfort can be achieved, it is preferably envisaged that the mounting point, via which the first check rail is coupled in an articulated manner to the wheel holder, in particular while bypassing the pivot bearing, has a second connecting element, which is coupled to the wheel holder or to the first check rail by means of a bearing bolt designed, for example, as a screw element or as a screw bolt. The previous and following statements relating to the first connecting element can readily also be transferred to the second connecting element. In particular, the second connecting element is a bearing or a bearing element. In particular, the second connecting element can be a rubber bearing or a joint, in particular a ball joint. In this case, the second connecting element, viewed in the radial direction of the bearing pin, has a bearing stiffness of at least 40 Newton meters per degree, in particular of at least 70 Newton meters per degree and in particular at least 100 Newton meters per degree. In particular when the bearing bolt is designed as a screw element or as a screw bolt, the screw element is, for example, rotated about a screw axis running in the axial direction of the second connecting element or coinciding with the axial direction of the second connecting element relative to the wheel holder and/or relative to the first check rail, in order thereby to screw the screw element and thus to connect the second connecting element to the wheel holder or to the check rail. In this case, the radial direction runs perpendicular to the screw axis, so that the mentioned bearing stiffness, also referred to as cardanic stiffness, extends perpendicularly to the screw axis, also referred to as the screwing direction. A particularly high stiffness of the second connecting element can thus be represented, so that undesired relative movements can also be avoided if the first check rail is coupled to the wheel holder in an articulated manner only via the one single mounting point having the second connecting element. As a result, the installation space required can be kept in a particularly small frame.

In order to avoid particularly effectively undesired relative movements and thus to be able to realize a particularly high driving comfort, it is envisaged in a further, alternative embodiment of the invention that the first check rail is coupled to the wheel holder in an articulated manner via precisely two mounting points which are spaced apart from one another and, for example, in particular exactly, a connecting element designed, for example, as a rubber bearing or ball joint. In this case, for example, the first check rail is designed on the side of the wheel holder as a suspension fork, which has, for example, two fork prongs spaced apart from one another in the axial direction of the connecting elements. At least one partial region of the wheel control arm is arranged, for example, between the fork prongs, viewed in the axial direction of the connecting elements. In this case, for example, one of the connecting elements is arranged on each of the fork prongs.

Finally, to realize a particularly high driving comfort, it has been shown to be particularly advantageous if the pivot bearing is mounted on the wheel holder so as to be pivotable about the pivot axis relative to the wheel holder by means of at least one bearing. In this case, the pivot bearing has a recess, formed as a through-opening and also referred to as a window, in which the bearing is at least partially arranged. In this case, the wheel holder engages in the recess, so that, for example, within the recess, the pivot bearing is mounted on the wheel holder to be pivotable about the pivot axis relative to the wheel holder via the bearing. For example, the bearing is or comprises a ball joint or a ball joint is formed by the bearing, wherein, for example, the pivot bearing can be mounted on the wheel holder to be pivotable about the pivot axis relative to the wheel holder by means of the ball joint. Furthermore, it is conceivable that said bearing is a ball bearing. In other words, the bearing can be a rolling bearing, in particular a ball bearing. Furthermore, it is conceivable that the bearing arranged at least partially in the recess is designed as a rubber bearing.

A second aspect of the invention relates to a motor vehicle which is also referred to as a vehicle or motor vehicle and is preferably designed as a motor vehicle and which has at least or exactly one vehicle axle which is designed as a multi-link axle and which has at least or exactly two wheel suspensions according to the first aspect of the invention. Advantages and advantageous embodiments of the first aspect of the invention are to be regarded as advantages and advantageous embodiments of the second aspect of the invention and vice versa. It is conceivable that the respective connecting element is designed as a respective ball joint and/or sliding joint.

Further details of the invention will become apparent from the following description of preferred exemplary embodiments with the associated drawings. In this case:

DETAILED DESCRIPTION OF THE DRAWINGS

In the figures, identical or functionally identical elements are envisaged with the same reference symbols.

Figure 1:
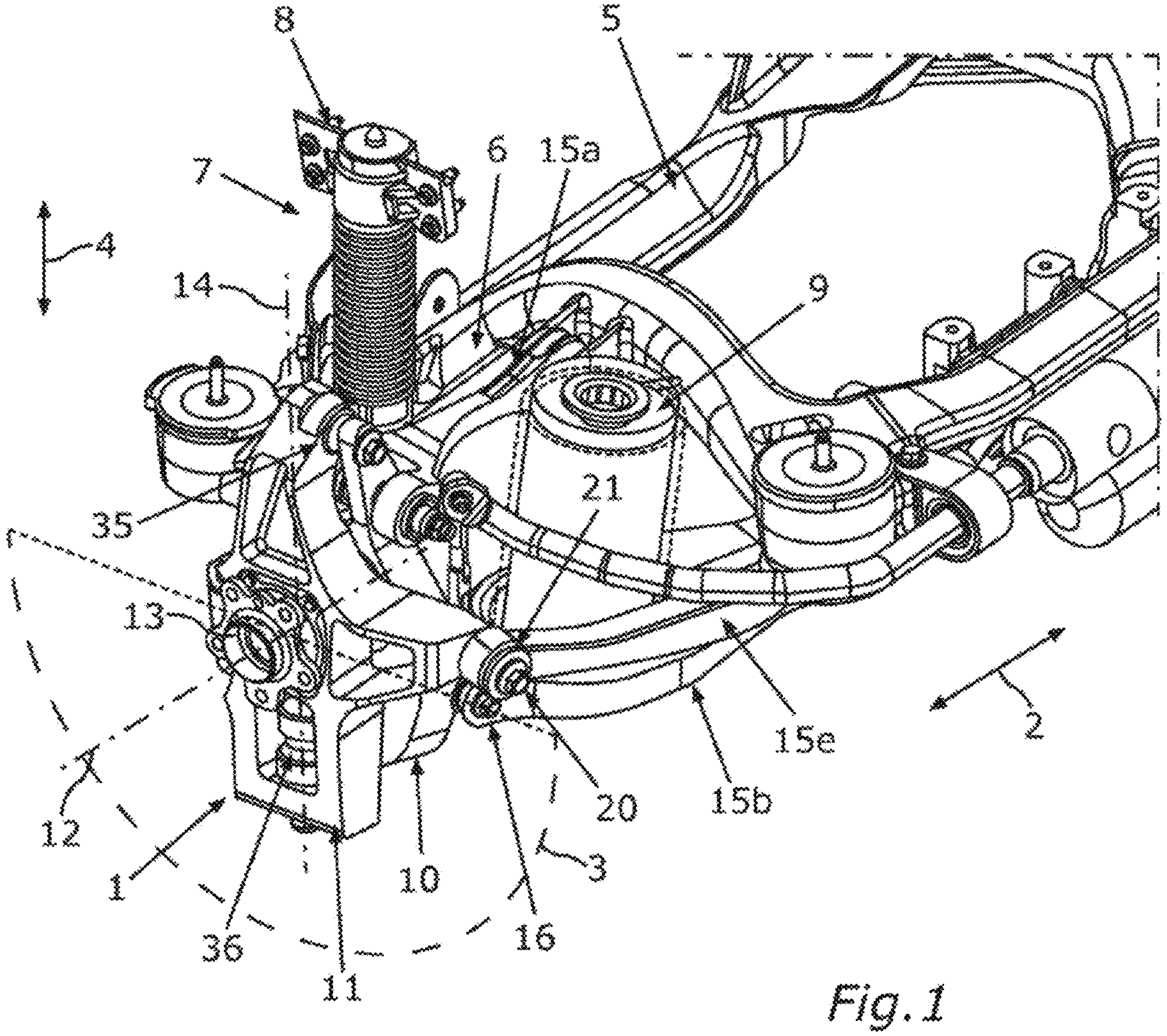
FIG. 1 shows a schematic perspective view of a first embodiment of a vehicle axle of a motor vehicle designed as a multi-link axle.

FIG. 1 shows, in a schematic perspective view, a first embodiment of a vehicle axle 1, which is designed as a multi-link axle and is simply also referred to as an axle, of a motor vehicle also referred to as a vehicle or motor vehicle and designed, for example, as a passenger car. This means that the motor vehicle has at least or exactly two vehicle axles arranged successively in the longitudinal direction of the motor vehicle and thus arranged one behind the other, namely the vehicle axle 1 as the first vehicle axle and a second vehicle axle. For example, the vehicle axle 1 is arranged behind the second vehicle axle in the longitudinal direction of the vehicle, so that, for example, the second vehicle axle is a front axle and the first vehicle axle 1 is a rear axle of the motor vehicle. The respective vehicle axle has at least or exactly two vehicle wheels which are arranged on opposite sides of the motor vehicle in the transverse direction of the motor vehicle and are simply referred to as wheels. The transverse direction of the vehicle is illustrated in FIG. 1 by a double arrow 2. One of the vehicle wheels of the vehicle axle 1 is shown particularly schematically and in detail in FIG. 1 and is designated by 3. The previous and following embodiments of the vehicle wheel 3 can readily be transferred to the other vehicle wheel (not shown in FIG. 1) of the vehicle axle 1 and vice versa. The vehicle wheels of the motor vehicle are ground contact elements, by means of which the motor vehicle can be supported or supported downward on a floor in the vertical direction of the vehicle of the motor vehicle. The vertical direction of the vehicle is illustrated by a double arrow 4 and runs perpendicular to the transverse direction of the vehicle. The vehicle wheels of the vehicle axle 1 are rear wheels. In particular, the vehicle wheels of the vehicle axle 1 are drivable or driven wheels. For example, the motor vehicle has a drive device, in particular an electric drive device, by means of which the vehicle wheels of the vehicle axle 1 can be driven, in particular purely electrically. The vehicle wheels of the second axle are front wheels. In this case, the vehicle has a front-axle steering, also referred to as a front-wheel steering system, which is also referred to as a first steering system. The front wheels can be steered by means of the first steering in order thereby to be able to bring about lane changes, direction changes and cornering of the motor vehicle. For example, the first steering system has a steering handle, designed as a steering wheel, which is actuated by a person such as, for example, the driver of the vehicle and can thereby in particular be rotated about a steering wheel rotation axis relative to a body of the motor vehicle. By rotating the steering wheel relative to the structure and around the steering wheel rotation axis, the front wheels can be pivoted relative to the body and thus steered, in order thereby to bring about the aforementioned cornering, driving direction changes and lane change of the motor vehicle. In this case, for example, the steering wheel is mechanically coupled to the front wheels.

The motor vehicle has the aforementioned structure, which is designed, for example, as a self-supporting body. The self-supporting body forms or delimits an interior space of the motor vehicle which is also referred to as a passenger cab or passenger compartment, wherein the steering handle is arranged in the interior. During travel of the motor vehicle, the above-mentioned persons can be inside the interior. The vehicle axle 1 has an axle support 5 designed as a rear axle support, which is formed separately from the structure and is mounted, elastically, on the structure. The axle carrier 5 is to be understood here as a chassis which is formed separately from the structure and to which the vehicle wheel 3 can be connected or is connected in an articulated manner, so that the vehicle wheel 3 can be connected or attached to the structure in an articulated manner via the axle carrier 5. If, in the following, it is mentioned that the vehicle wheel 3 can be connected or is connected in an articulated manner to the axle carrier 5, it should be understood that the vehicle wheel 3 (also) can be attached or connected in an articulated manner to the structure, specifically by means of the axle carrier 5.

The vehicle axle 1 has, per vehicle wheel of the vehicle axle 1, a wheel suspension 6, via which the vehicle wheel 3 is connected in an articulated manner to the axle carrier 5 and thus via the axle carrier 5 to the structure. In particular, the wheel suspension 6, for example at least substantially in the vertical direction of the vehicle (double arrow 4), allows first relative movements between the vehicle wheel 3 and the axle carrier 5 or the structure to be carried out at least substantially in the vertical direction of the vehicle (double arrow 4), wherein, for example, wheel suspension 6 at least limits or prevents second relative movements between the vehicle wheel 3 and the axle carrier 5 and thus the structure. The first relative movements are spring and rebound movements of the vehicle wheel, the retraction and rebound movements of which are also referred to collectively as wheel movements. At least with regard to the wheel movements, the vehicle wheel 3 is spring-loaded via a spring and/or damper element 7 and is supported on the structure in a damped manner. For this purpose, the spring and/or damper element 7 comprises a vibration damper 8, also referred to as a shock absorber, which is designed, for example, as a hydraulic shock absorber. The damping and rebound movements (wheel movements) are damped by means of the vibration damper 8. The spring and/or damper element 7 also comprises a spring 9, also referred to as a supporting spring, which can be designed as a mechanical spring. In the first embodiment, however, the spring 9 is designed as an air spring. During the respective wheel movement of the vehicle wheel 3, which takes place relative to the structure, the spring 9 is tensioned, for example, as a result of which the spring 9 provides, for example, a spring force opposing the respective wheel movement. It can be seen from FIG. 1 that the vibration damper 8 and the spring 9 are not arranged approximately one inside the other in the exemplary embodiment shown, but rather the vibration damper 8 and the spring 9 are arranged externally, i.e., completely outside of each other. Alternatively, the vibration damper 8 and the spring 9 could be arranged coaxially and one inside the other.

The wheel suspension 6 has a wheel holder 10 and a pivot bearing 11, formed separately from the wheel holder 10, on which the vehicle wheel 3 is rotatably mounted about a wheel rotation axis 12 relative to the pivot bearing 11. For this purpose, a wheel hub 13 is envisaged, which is rotatably mounted on the pivot bearing 11 via, in particular at least or precisely, a rolling bearing about the wheel rotation axis 12 relative to the pivot bearing 11. In this case, the vehicle wheel 3 is connected to the wheel hub 13 in a rotationally fixed manner, in a non-destructive manner. The pivot bearing 11 is pivotable relative to the wheel holder 10 about a pivot axis 14 running obliquely or perpendicularly to the wheel rotation axis 12 and also referred to as a steering axis, and is thereby supported on the wheel holder 10 so as to be steerable, so that the pivot bearing 11 and therewith the vehicle wheel 3 can be pivoted about the steering axis relative to the wheel holder 10 and relative to the axle carrier 5 and the structure and can thus be steered. As a result, for example, the aforementioned cornering, driving direction changes and lane changes can be brought about and/or supported. For example, the pivot bearing 11 is a component of a second steering system, also referred to as a rear axle steering system, which is designed, for example, as a steer-by-wire system and thus has no mechanical connection to the steering handle. The second steering system comprises, for example, a motor, not shown in the figures, and in particular is designed as an electric motor, by means of which the pivot bearing 11 and therewith the vehicle wheel 3 can be pivoted about the pivot axis 14 relative to the wheel holder 10 in order to steer the vehicle wheel 3 and thus of the motor vehicle. For this purpose, the motor can drive the pivot bearing 11 and thus pivot about the pivot axis 14 (steering axis) relative to the wheel holder 10. It can be seen that the wheel holder 10, the pivot bearing 11 and the vehicle wheel 3 jointly execute the wheel movement. However, if the pivot bearing 11 and the vehicle wheel 3 are steered, the wheel holder 10 is not steered.

The first embodiment is shown in FIGS. 1 to 5. As can be seen from FIGS. 1 to 5, exactly four check rails, namely a first check rail 15*a*, a second check rail 15*b*, a fourth check rail 15*c* and a fifth check rail 15*d*, are coupled in an articulated manner to the wheel holder 10, while bypassing the pivot bearing 11 and in particular also bypassing the axle support 5 (chassis). Via the four check rails 15*a*-15*d*, the wheel holder 10 is connected in an articulated manner to the axle carrier 5 and thus to the structure, in particular while bypassing the pivot bearing 11. Furthermore, in the wheel suspension 6, it is envisaged that the wheel suspension 6 has exactly one third check rail 15*e*, which is coupled in an articulated manner to the pivot bearing 11 via, precisely, a first rubber bearing 20, bypassing the wheel holder 10, which is also referred to as a tie rod. The first rubber bearing 20 is a first connecting element or is also referred to as a first connecting element. The first connecting element could alternatively be designed, for example, as a first ball joint. By means of the third check rail 15*e*, the pivot bearing 11 and therewith the vehicle wheel 3 can be pivoted about the pivot axis 14 relative to the wheel holder 10, by a translational movement of the third check rail 15*e* which takes place relative to the wheel holder 10 and relative to the axle carrier 5. Thus, for example, the aforementioned motor is coupled to the pivot bearing 11 via the third check rail 15*e*, in particular in an articulated manner.

In the first embodiment, the second check rail 15*b*, the fourth check rail 15*c* and the fifth check rail 15*d* are designed as rod links, thus as two-point links, which are also referred to as first rod links or first two-point links. As can be seen, for example, in FIG. 4 on the example of the check rail 15*c*, the respective first rod link has exactly one first mounting point 16, by means of which the respective first rod link is articulated to the wheel holder 10 in an articulated manner, while bypassing the pivot bearing 11. In addition, the respective first rod link has exactly one second mounting point 17, by means of which the respective first rod link, while bypassing the pivot bearing 11 and bypassing the wheel holder 10, can be coupled or coupled in an articulated manner to the axle support 5 and thus to the structure. In the first embodiment, the respective first mounting point 16, precisely, comprises a respective first rubber bearing 18, via which the respective first rod link is coupled in an articulated manner to the wheel holder 10, while bypassing the pivot bearing 11. Thus, in the first embodiment, it is envisaged that the respective first rod link is coupled in an articulated manner to the wheel holder 10 via precisely one respective rubber bearing, namely the respective rubber bearing 18, while bypassing the pivot bearing 11. In the first embodiment, the respective first rubber bearing 18 is arranged at least partially in the respective first rod link. For example, the respective second mounting point 17 has exactly one second rubber bearing 19, by means of which the respective first rod link is articulated to the axle support 5 and thus to the structure. Thus, in the first embodiment, it is envisaged that the respective first rod link is coupled in an articulated manner to the axle support 5 via precisely one respective rubber bearing, namely the rubber bearing 19. The respective rubber bearing 19 can be arranged, for example, at least partially in the respective first rod link. In the first embodiment, the third check rail 15*e* is coupled in an articulated manner to the pivot bearing 11 via exactly one third rubber bearing, namely via the rubber bearing 20 (FIG. 1), while bypassing the wheel holder 10.

Here, for example, the check rail 15*e* is also designed as a second rod link, thus as a second two-point link. The second rod link has exactly one third mounting point 21, by means of which the second rod link is coupled in an articulated manner to the pivot bearing 11, while bypassing the wheel holder 10. In particular, the mounting point 21 comprises the rubber bearing 20. In particular, the rubber bearing 20 is arranged at least partially in the check rail 15*e*. Furthermore, for example, the third check rail 15*e* has exactly one fourth mounting point 22 (FIG. 5), in particular as a first coupling point, by means of which the check rail 15*e* can be coupled or coupled to the chassis, that is to say to the axle carrier 5, in particular in an articulated manner, in particular in such a way that the check rail 15*e* is coupled to the motor by means of the mounting point 22, in particular in an articulated manner. In this case, the mounting point 22, precisely, can have a fourth rubber bearing via which, for example, the check rail 15*e* with the structure, in particular with the motor, which is coupled, for example, to the structure. Thus, for example, the second rod link is coupled or can be coupled via precisely one rubber bearing, namely via the fourth rubber bearing, to the structure, in particular by means of the motor and/or bypassing the wheel holder 10 and the pivot bearing 11.

Figure 2:
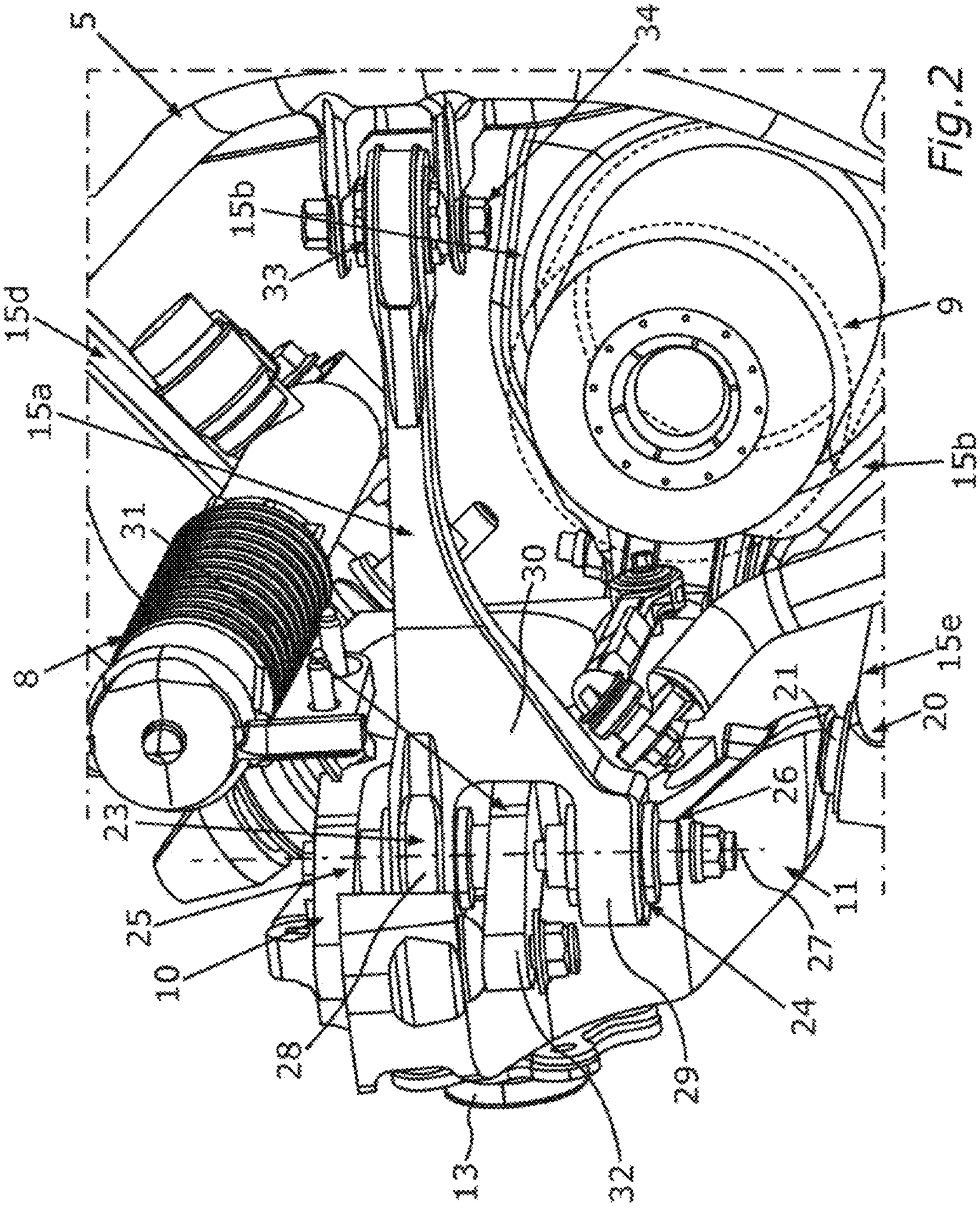
FIG. 2 shows a detail of a schematic plan view of the first embodiment of the vehicle axle.
Figure 3:
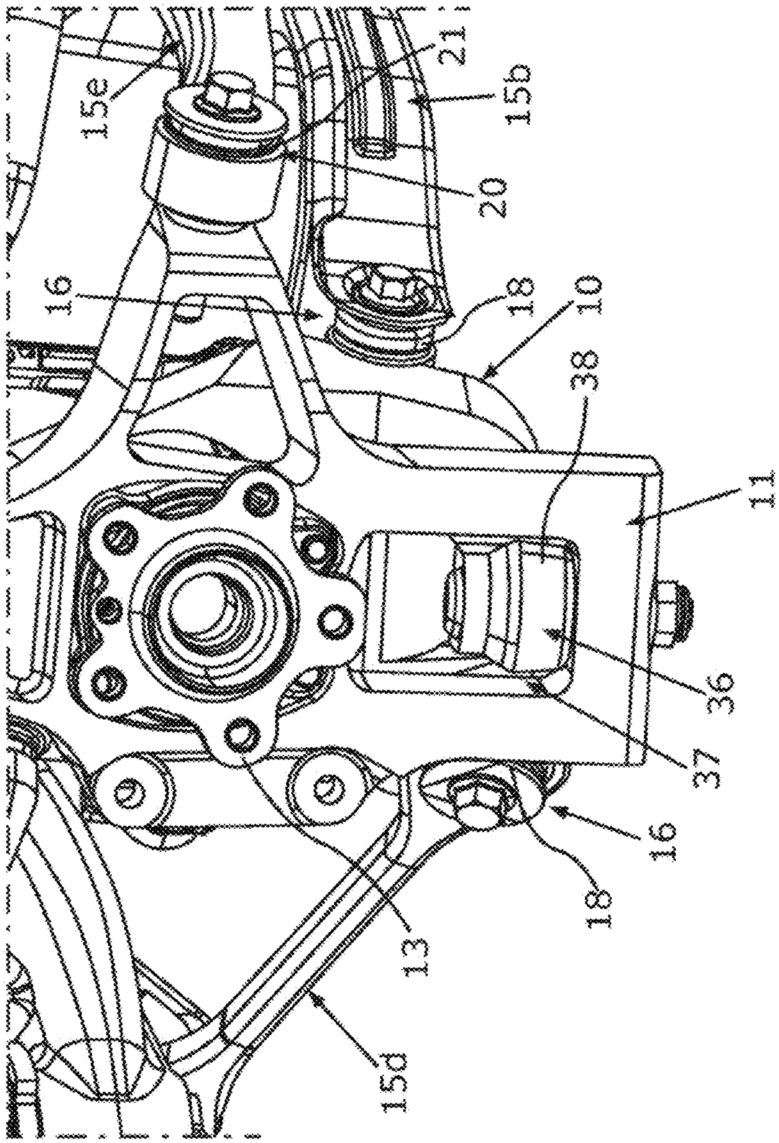
FIG. 3 shows a detail of a further schematic perspective view of the vehicle axle according to the first embodiment.
Figure 4:
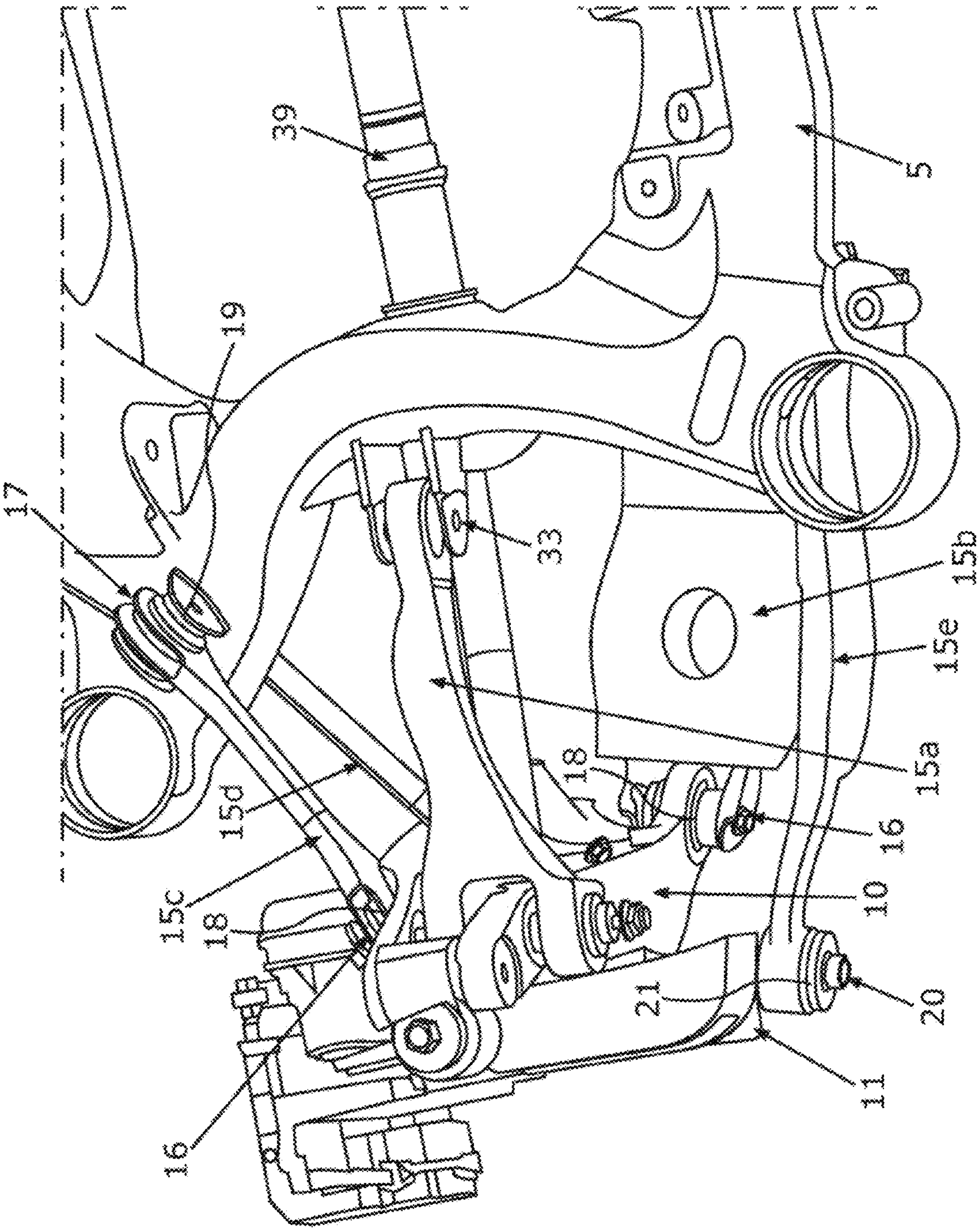
FIG. 4 shows a detail of a further schematic perspective view of the vehicle axle according to the first embodiment.
Figure 5:
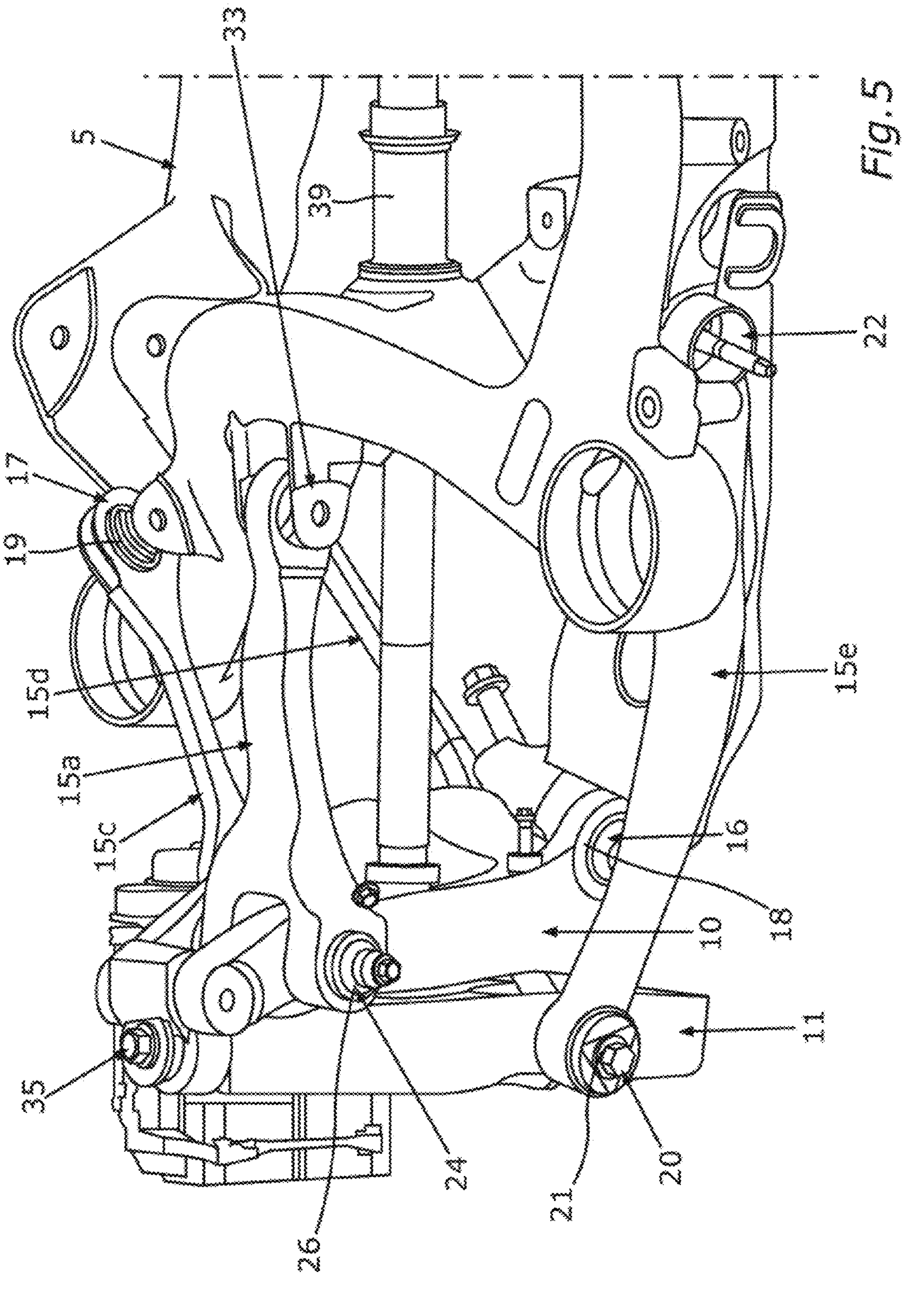
FIG. 5 shows a detail of a further schematic perspective view of the vehicle axle according to the first embodiment.

It can be seen particularly clearly from FIGS. 1, 2, 4 and 5 that the check rail 15*a* is designed as a fork on the wheel holder side. The check rail 15*a* has precisely two fifth mounting points 23 and 24 which are spaced apart from one another and by means of which the check rail 15, while bypassing the pivot bearing 11, is coupled in an articulated manner to the wheel holder 10. In this case, the respective mounting point 23, 24 comprises exactly one respective, fifth rubber bearing 25, 26, via which the check rail 15*a* is coupled in an articulated manner to the wheel holder 10, while bypassing the pivot bearing 11. Thus, in the first embodiment, the check rail 15*a* is coupled in an articulated manner to the wheel holder 10 via exactly two rubber bearings, namely the rubber bearings 25 and 26, while bypassing the pivot bearing 11. The rubber bearings 25 and 26 are spaced apart from one another, in the axial direction of the respective rubber bearing 25, 26, the axial direction of which is illustrated in FIG. 2 by a dash-dotted line 27. Since the check rail 15*a* is fork-shaped on the wheel holder side, the check rail 15*a* has fork prongs 28 and 29 which are simply referred to as tines and which project from a base body region 30 of the check rail 15*a* and are spaced apart from one another in the axial direction of the respective rubber bearing 25, 26. In this case, the mounting point 23 is envisaged on the fork tine 28 and the mounting point 24 is envisaged on the fork tine 29. In the present case, the rubber bearing 25 is at least partially arranged on the fork tine 28 and the rubber bearing 26 is arranged at least partially on the fork tine 29, so that the rubber bearings 25 and 26 are each arranged at least partially on the check rail 15*a*. The fork prongs 28 and 29 and the base body region 30 delimit a receptacle 31, in which a partial region 32 of the wheel holder 10 is arranged. The wheel holder 10 is coupled to the rubber bearings 25 and 26, for example, by means of a bearing bolt, the axial direction or longitudinal extension direction of which coincides with the axial direction of the respective rubber bearing 25, 26, so that the wheel holder 10 is coupled to the rubber bearings 25 and 26 via its partial region 32. As a result, the check rail 15*a* is coupled in an articulated manner to the partial region 32 and to the wheel holder 10 via the precisely two rubber bearings 25, 26, while bypassing the pivot bearing 11. For example, the bearing bolt is a screw bolt, thus a screw element, by means of which the wheel holder 10 is coupled by screws, that is to say by screwing to the rubber bearings 25 and 26. For this purpose, for example, the bearing bolt and/or a further screw element, which is screwed, for example, to the bearing bolt, in order thereby to couple the bearing bolt to the rubber bearings 25 and 26, is rotated relative to the check rail 15*a* and relative to the wheel holder 10 about a screw axis coinciding with the axial direction of the respective rubber bearing 25, 26, in order thereby to screw the bearing bolt, in particular to the corresponding further screw element, and thus to couple or connect the bearing pin to the respective rubber bearing 25, 26, and consequently to couple or connect the bearing pin to the respective rubber bearing 25, 26. The screw axis is one or runs along a screwing direction along which, for example, the bearing bolt and/or the further screw element is moved in particular by the respective screwing, in particular translationally, in order to connect the bearing pin to the respective rubber bearing 25, 26.

The check rail 15*a* has exactly one sixth mounting point 33, by means of which the check rail 15*a* can be coupled or coupled to the axle carrier 5 and thus to the structure, in particular bypassing the wheel holder 10 and bypassing the pivot bearing 11. In this case, for example, the mounting point 33, precisely, comprises a sixth rubber bearing 34, via which the check rail 15*a* is articulated or coupled to the axle carrier 5 and thus to the structure. Thus, it is envisaged in the present case that the check rail 15*a* is coupled in an articulated manner to the axle carrier 5 via precisely one rubber bearing, namely the rubber bearing 34.

It can be seen from FIG. 1 that the pivot bearing 11 is pivotably coupled to the wheel holder 10 by means of exactly two joints 35 and 36 about the pivot axis 14 relative to the wheel holder 10. Thus, the joints 35 and 36 form or define the pivot axis 14. The respective joint 35, 36 can be or comprise a respective rubber bearing. Furthermore, the respective joint 35, 36 can be or comprise a ball joint. Furthermore, the respective joint 35, 36 can be or comprise a rolling bearing, in particular a ball bearing, or a plain bearing. As can be seen particularly well from FIGS. 1 and 3, the pivot bearing 11 has a recess 37, which in the present case is formed as a through-opening and also referred to as a window, in which the lower joint 36, as viewed in the vertical direction of the vehicle, is at least partially, in particular at least predominantly and thus at least more than half, accommodated. In the present case, for example, the recess 37 is penetrated by the joint 36. A second partial region 38 of the wheel holder 10 is accommodated in the recess 37, in particular in such a way that the partial region 38 penetrates the recess 37. In this case, for example, the partial region 38 is connected in an articulated manner to the pivot bearing 11 by means of the joint 36 or the joint 36 comprises the partial region 38 of the wheel holder 10. As a result, the joint 36 and thus the pivot bearing 11 can advantageously be arranged close to a brake disc, not shown in the figures and connected for example in a rotationally fixed manner to the wheel hub 13, of a friction brake in the present case designed as a disc brake, by means of which the wheel hub 13 and thus the vehicle wheel 3 can be braked, in particular with regard to rotations taking place about the wheel rotation axis 12. It is conceivable that, in the first embodiment, the joint 36 is designed as a pivot joint, which can comprise, for example, the partial region 38 as a joint part.

As stated above, the vehicle wheel 3 can be driven by means of the drive device of the motor vehicle. For this purpose, the wheel hub 13 can be driven by means of the drive device and can thereby be rotated about the wheel rotation axis 12 relative to the pivot bearing 11. For this purpose, as can be seen from FIG. 4, a side shaft 39, designed as a universal shaft, in particular as a homokinetic articulated shaft, is envisaged, via which the wheel hub 13 can be driven by means of the drive device and can thereby be rotated about the wheel rotation axis 12 relative to the pivot bearing 11. As a result, the vehicle wheel 3 can be driven.

Figure 6:
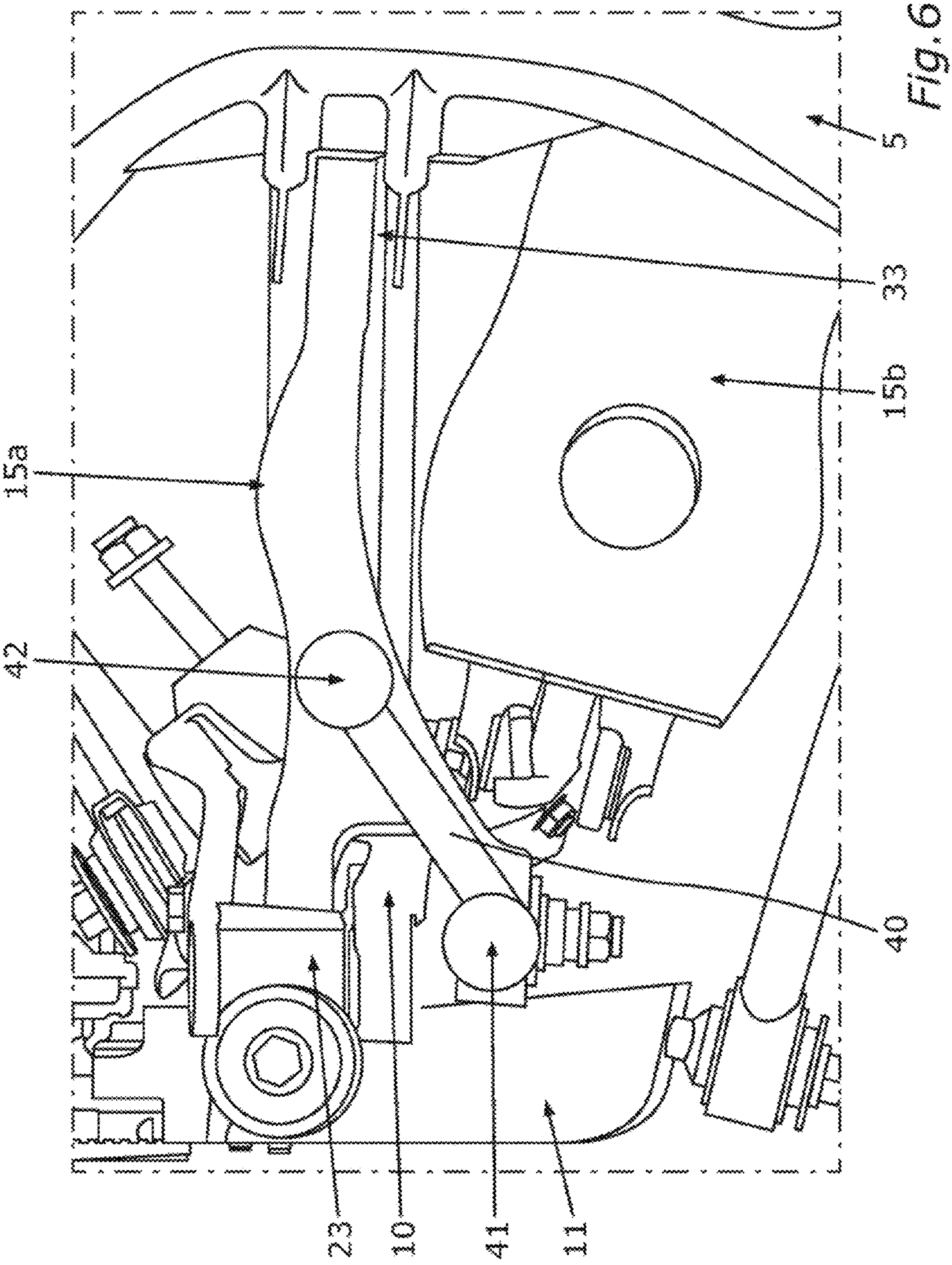
FIG. 6 shows a detail of a schematic plan view of a second embodiment of the vehicle axle.

FIG. 6 shows a schematic plan view of a second embodiment of the wheel suspension 6. The second embodiment differs from the first embodiment in that, in the second embodiment, the first check rail 15*a* is also designed as a rod link, thus as a two-point link. As in the first embodiment, the check rail 15*a* has exactly one mounting point, namely the mounting point 33, by means of which the check rail 15*a* can be coupled or coupled in an articulated manner to the chassis, in the present case to the axle carrier 5, wherein, as described above, the mounting point 33 has exactly one rubber bearing, namely the rubber bearing 34, by means of which the check rail 15*a* can be coupled or coupled in an articulated manner to the axle support 5 and thus to the chassis (structure). Thus, in the second embodiment, the check rail 15*a* is also coupled in an articulated manner to the axle carrier 5 via precisely one rubber bearing, namely the rubber bearing 34. On the wheel holder side, however, in the second embodiment it is envisaged with respect to the check rail 15*a* that the check rail 15*a* has exactly one mounting point, namely the mounting point 23, by means of which the check rail 15*a* is coupled in an articulated manner to the wheel holder 10, while bypassing the pivot bearing 11.

Preferably, the mounting point 23 has exactly one rubber bearing, namely the rubber bearing 25, by means of which the check rail 15*a* is coupled in an articulated manner to the wheel holder 10, while bypassing the pivot bearing 11. Thus, in the second embodiment, the check rail 15*a* is coupled in an articulated manner to the wheel holder 10 via precisely one rubber bearing, namely the rubber bearing 25, while bypassing the pivot bearing 11. In order, however, to be able to avoid excessive and undesired relative movements between the vehicle wheel 3 and the axle carrier 5, in addition to the check rails 15*a*-15*e*, there is envisaged a pendulum support 40, which is shown particularly schematically in FIG. 6 and is coupled in an articulated manner to the wheel holder 10 via exactly one first mounting point 41, in particular by bypassing the pivot bearing 11, and is coupled in an articulated manner to the check rail 15*a* via exactly one mounting point 42 spaced apart from the mounting point 41, in particular while bypassing the pivot bearing 11, the wheel holder 10 and the other check rails 15*b-e*, in particular all other check rails of the wheel suspension 6. It is conceivable that the respective mounting point 41, 42, in particular exactly, has a respective rubber bearing, via which the pendulum support 40 is coupled in an articulated manner to the wheel holder 10 or to the check rail 15*a*. Thus, for example, the pendulum support 40 is coupled in an articulated manner to the wheel holder 10 via precisely one rubber bearing, by bypassing the pivot bearing 11, and for example the pendulum support 40 is coupled in an articulated manner to the check rail 15*a* via precisely one rubber bearing.

Figure 7:
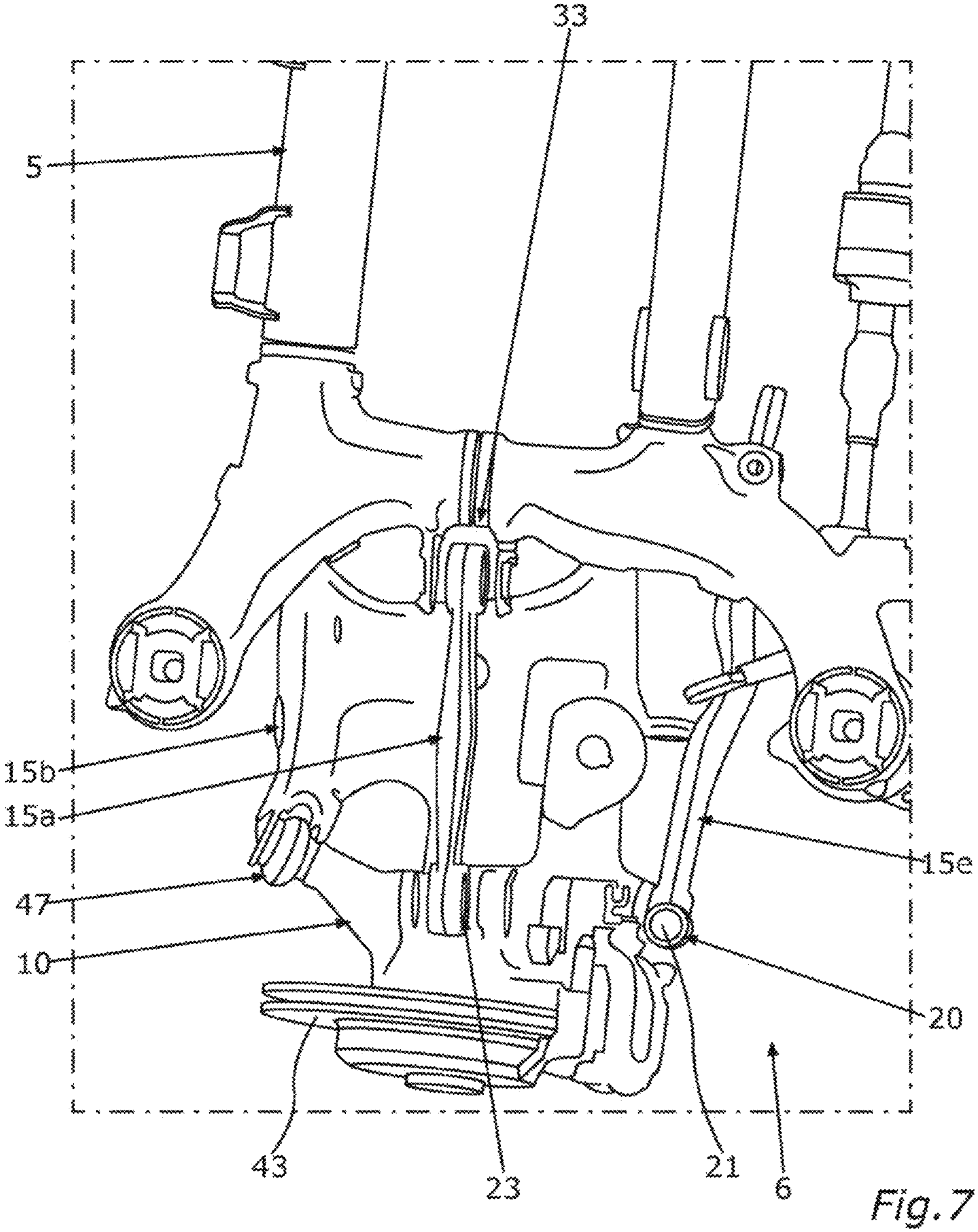
FIG. 7 shows a detail of a schematic plan view of a third embodiment of the vehicle axle.
Figure 8:
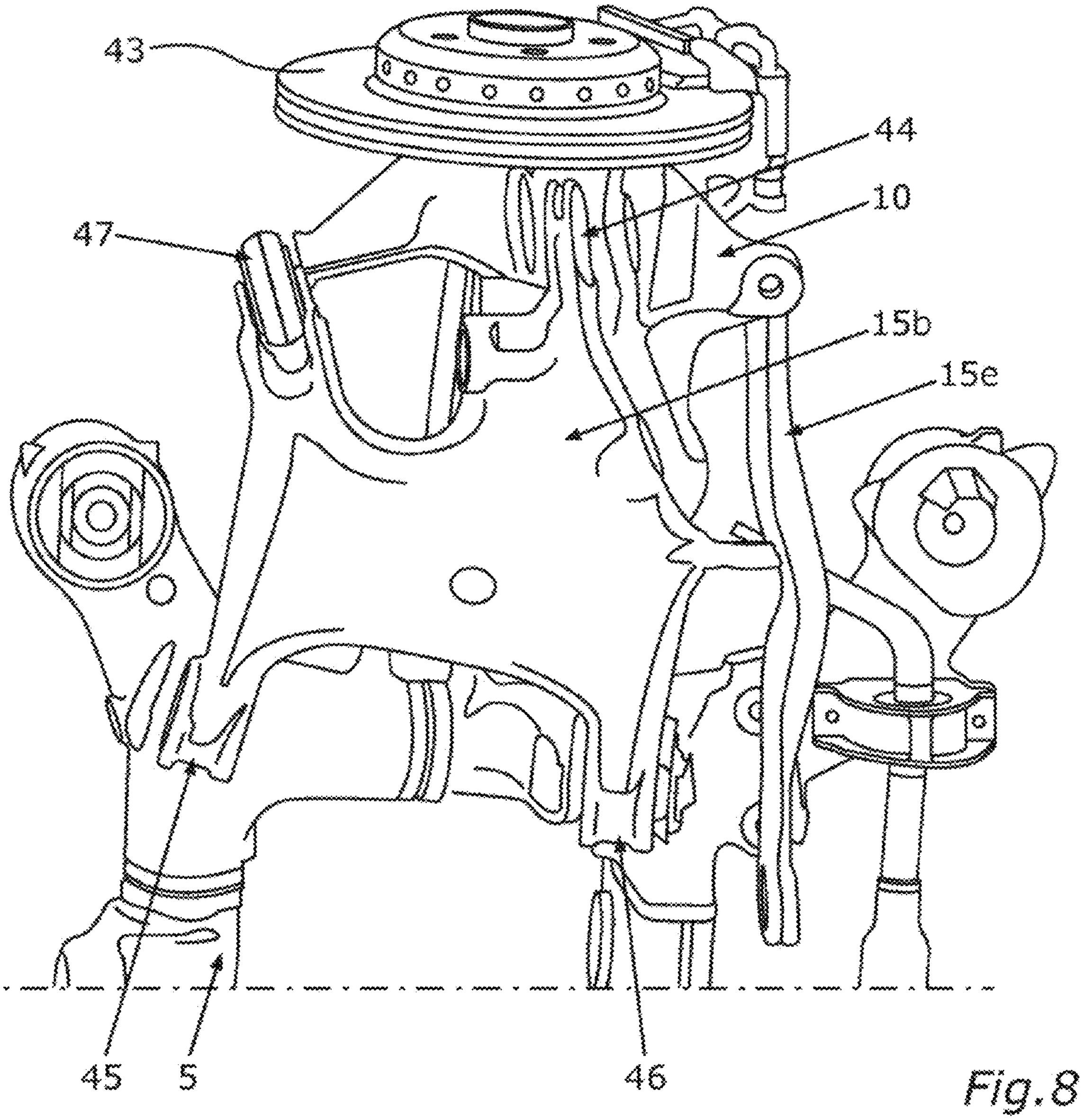
FIG. 8 shows a detail of a schematic and perspective top view of the the vehicle axle according to the third embodiment.
Figure 9:
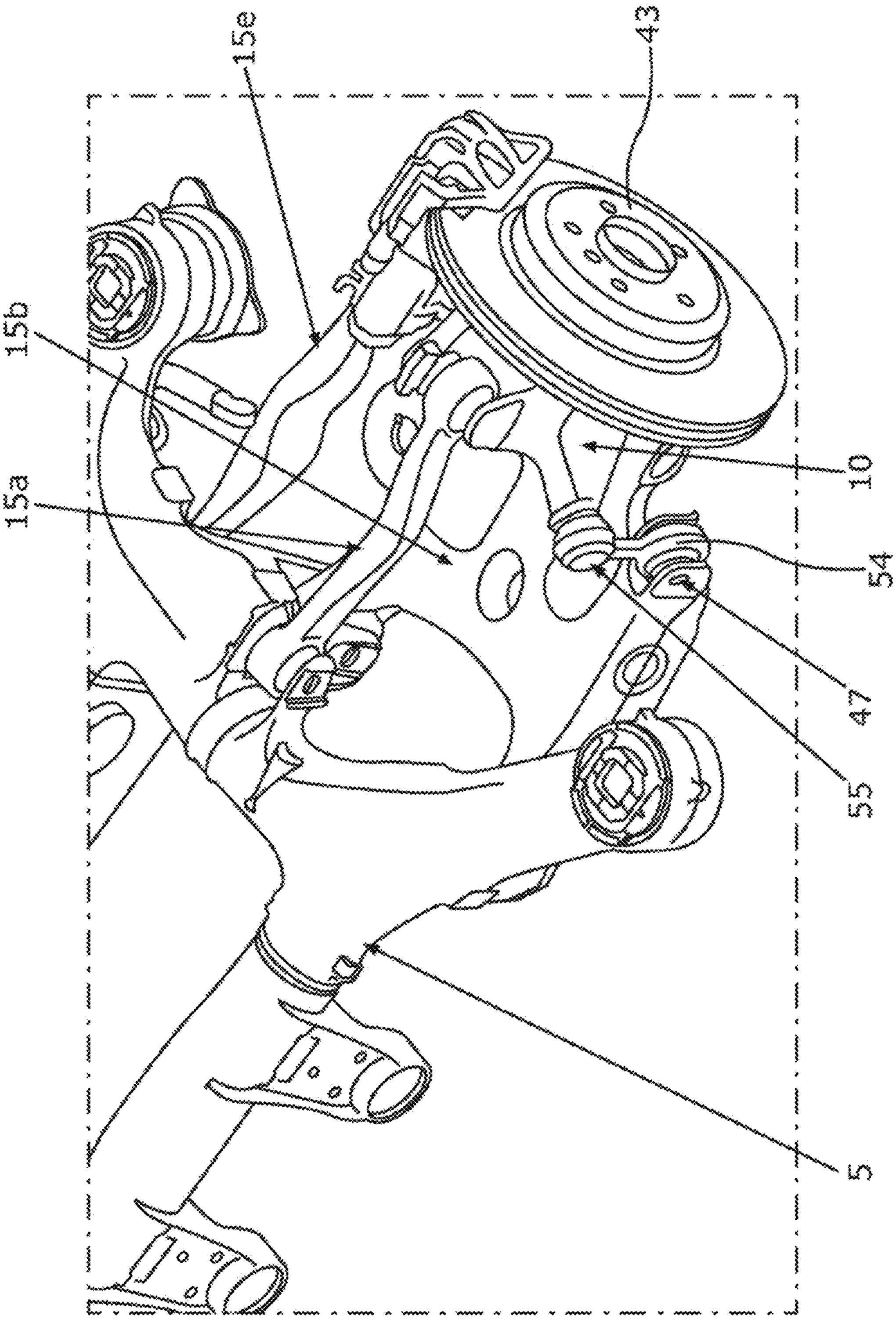
FIG. 9 shows a detail of a schematic perspective view of the vehicle axle according to the third embodiment.

FIGS. 7 to 9 show a third embodiment of the wheel suspension 6. The aforementioned brake disk for braking the wheel hub 13 and thus of the vehicle wheel 3 is designated 43. The pivot bearing 11, with which the third check rail 15 *e* is coupled in an articulated manner, is not shown separately. As in the second embodiment, the first check rail 15*a* is designed as a rod link, thus as a two-point link. Thus, in the third embodiment, the check rail 15*a* has exactly one mounting point 23, by means of which the check rail 15*a* is coupled in an articulated manner to the wheel holder 10, while bypassing the pivot bearing 11. In this case, for example, the mounting point 23, precisely, has a rubber bearing via which the check rail 15*a* is coupled in an articulated manner to the wheel holder 10, in particular while bypassing the pivot bearing 11. Thus, in the third embodiment, the check rail 15*a* is coupled in an articulated manner to the wheel holder 10 via precisely one rubber bearing and thereby bypassing the pivot bearing 11. Furthermore, the check rail 15*a* has exactly one mounting point 33 which is spaced apart from the mounting point 23 and by means of which the check rail 15*a* can be coupled or coupled to the axle support 5 and thus to the chassis (structure). In this case, for example, the mounting point 33 comprises exactly one rubber bearing via which the check rail 15*a* is articulated or coupled in an articulated manner to the axle carrier 5 and thus to the chassis, while bypassing the wheel holder 10 and the pivot bearing 11 and the remaining or all remaining check rails of the wheel suspension 6. Thus, for example, in the third embodiment, the check rail 15*a* is coupled in an articulated manner to the axle carrier 5 via precisely one rubber bearing, by bypassing the wheel holder 10, the pivot bearing 11 and all other check rails of the wheel suspension 6.

In this case, the second check rail 15*b* is designed as a three-point rocker which has exactly one first mounting point 44 (FIG. 8) is coupled in an articulated manner to the wheel holder 10, while bypassing the pivot bearing 11. In particular, the mounting point 44 comprises, precisely, a rubber bearing via which the three-point rocker is coupled in an articulated manner to the wheel holder 10, while bypassing the pivot bearing 11. Thus, for example, the three-point rocker is coupled in an articulated manner to the wheel holder 10 via precisely one rubber bearing, while bypassing the pivot bearing 11. Furthermore, the three-point rocker has exactly two mounting points 45 and 46 spaced apart from one another and spaced apart from the mounting point 44, by means of which the three-point rocker can be coupled or coupled in an articulated manner to the axle carrier 5 and thus to the chassis, in particular while bypassing the wheel holder 10, the pivot bearing 11 and the or all other wheel arms of the wheel suspension 6. In this case, for example, the respective mounting point 45, 46, precisely, has a rubber bearing via which the three-point rocker is coupled or can be coupled in an articulated manner to the axle carrier 5 and thus to the chassis (structure). Thus, for example, the three-point rocker can be coupled or coupled to the axle carrier 5 via exactly two rubber bearings spaced apart from one another, in particular by bypassing the wheel holder 10, the pivot bearing 11 and the or all other wheel arms of the wheel suspension 6.

In order to be able to avoid undesired relative movements between the vehicle wheel 3 and the chassis, a pendulum support 54, also referred to as a first pendulum support, is envisaged, which is coupled in an articulated manner to the three-point rocker via exactly one mounting point 47 spaced apart from the mounting points 44, 45 and 46, in particular by bypassing the wheel holder 10, the pivot bearing 11 and the or all other wheel arms of the wheel suspension 6. Moreover, the pendulum support 54 is coupled in an articulated manner to the wheel holder 10 via exactly one mounting point 55 spaced apart from the mounting points 44, 45, 46 and 47, while bypassing the pivot bearing 11 and all the other check rails of the wheel suspension 6. For example, the respective mounting point 47, 55, precisely, has a respective rubber bearing via which the pendulum support 54 is coupled in an articulated manner to the three-point rocker or to the wheel holder 10. Thus, for example, the pendulum support 54 is coupled in an articulated manner to the three-point swing arm via precisely one rubber bearing and to the wheel holder 10 via precisely one rubber bearing. In particular when the check rail 15*a* in the third embodiment is designed as a rod link, which is shown in FIGS. 7 to 9, it may be expedient to use a second pendulum support envisaged in addition to the pendulum support 54, namely, for example, the pendulum support 40 of the second embodiment, in order to be able to avoid undesired, excessive relative movements between the vehicle wheel 3 and the chassis. As in the second embodiment, in the third embodiment, the pendulum support 40 is also coupled in an articulated manner to the wheel holder 10 by means of precisely one mounting point, the mounting point 41, in particular while bypassing the pivot bearing 11 and bypassing the or all other check rails of the wheel suspension 6, and as in the second embodiment, in the third embodiment, the second pendulum support 40 would then be coupled in an articulated manner to the check rail 15*a* by means of precisely one mounting point, namely the mounting point 42, in particular while bypassing the pivot bearing 11, the wheel holder 10 and the or all other check rails of the wheel suspension 6. The use of the second pendulum support, which is envisaged in addition to the pendulum support 54, can be avoided, in particular, as in the first embodiment, the check rail 15*a* is fork-shaped on the wheel holder side and is thus coupled in an articulated manner to the wheel holder 10 by means of the exactly two mounting points 23 and 24, in particular while bypassing the pivot bearing 11 and the or all other wheel arms of the wheel suspension 6.

Furthermore, it would be conceivable to design the check rail 15*a*, as shown in FIGS. 7 to 9, as a rod link, consequently as a two-point link, and to avoid both the use of the second pendulum support and the fork-shaped configuration of the check rail 15*a* on the wheel holder side, if, for example, the rubber bearing 25 of the mounting point 23 has, viewed in the radial direction of the rubber bearing 25 and thus perpendicular to the screw axis, a bearing stiffness of at least 40 Newton meters per degree, in particular of at least 70 Newton meters per degree and very particularly at least 100 Newton meters per degree.

Figure 10:
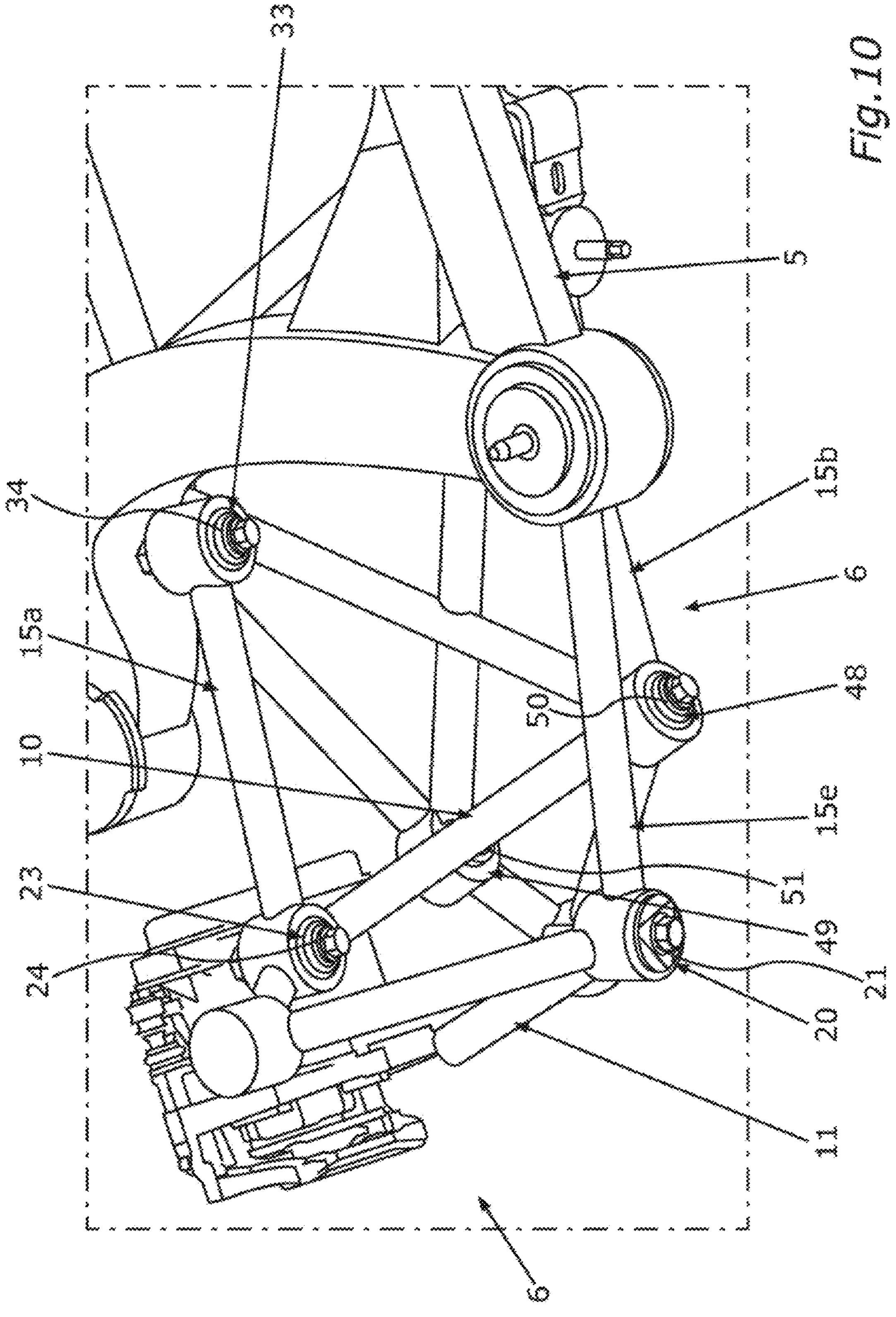
FIG. 10 shows a detail of a schematic perspective view of a fourth embodiment of the vehicle axle.
Figure 11:
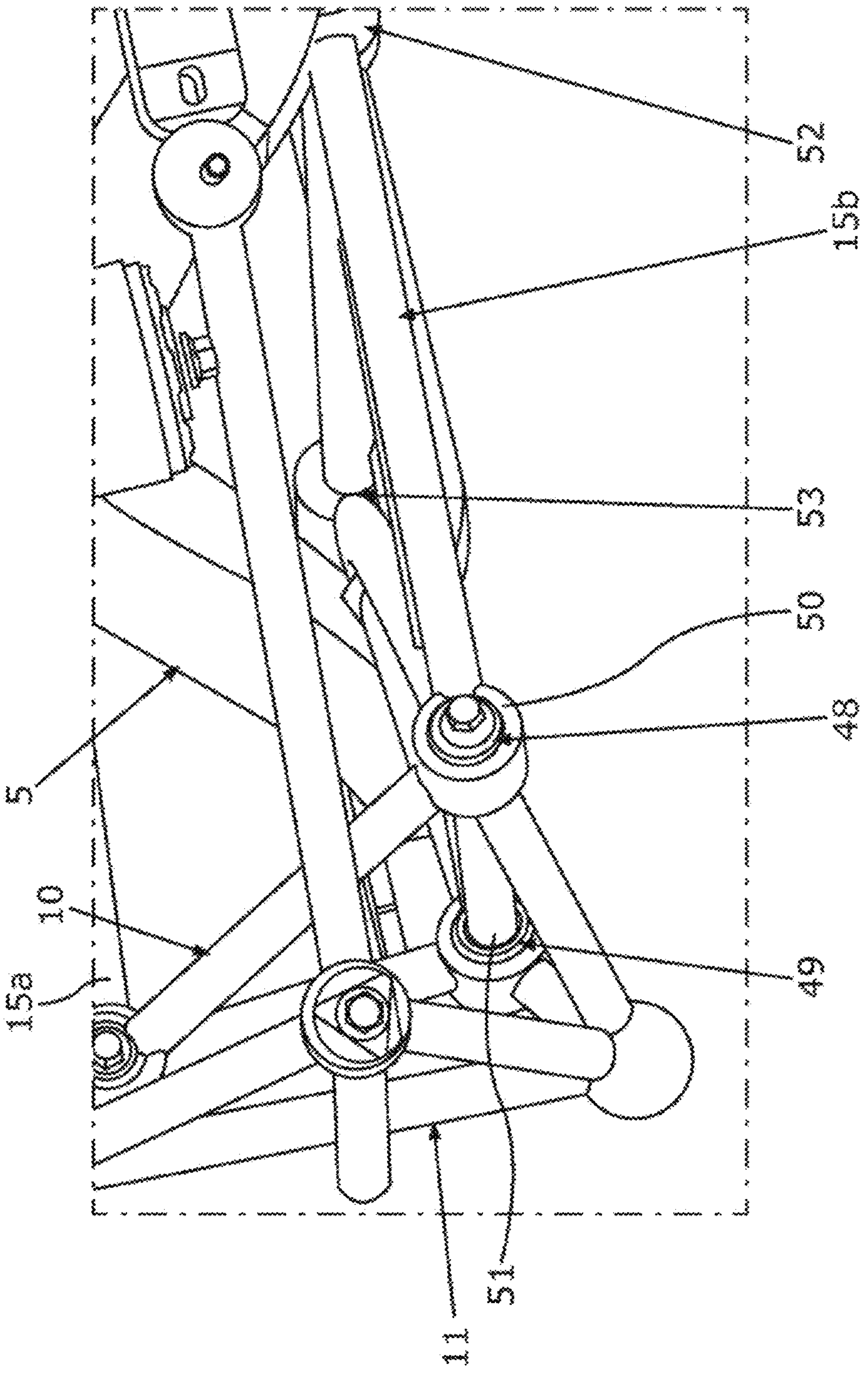
FIG. 11 shows a detail of a further schematic perspective view of the vehicle axle according to the fourth embodiment.

Finally, FIGS. 10 and 11 show a fourth embodiment of the wheel suspension 6. In the fourth embodiment, the second check rail 15*b* is designed as a four-point rocker which has exactly two spaced-apart mounting points 48 and 49, in particular while bypassing the pivot bearing 11 and the or all other check rails of the wheel suspension 6. For example, the respective mounting point 48, 49, precisely, has a respective rubber bearing 50, 51, via which the four-point rocker is coupled in an articulated manner to the wheel holder 10. Thus, in the present case, the four-point rocker is coupled in an articulated manner to the wheel holder 10 via exactly two rubber bearings, namely the rubber bearings 50 and 51, while bypassing the pivot bearing 11 and all or the remaining check rails of the wheel suspension 6. Furthermore, the four-point rocker has exactly two mounting points 52 and 53 spaced apart from one another and from the mounting points 48 and 49, by means of which the four-point rocker (check rail 15*b*) can be coupled or coupled in an articulated manner to the axle support 5 and thus to the chassis (structure). In addition, it can be seen that, The mounting points 48 and 49 are spaced apart from one another and from the mounting points 52 and 53. The respective mounting point 52, 53 has, in particular precisely, a respective rubber bearing via which the four-point rocker can be coupled or coupled in an articulated manner to the axle carrier 5 and thus to the chassis. Thus, in the present case, the four-point rocker can be coupled or coupled in an articulated manner to the axle carrier 5 via exactly two rubber bearings and thus to the chassis. By using the four-point rocker as the check rail 15*b*, the first check rail 15*a* can be designed as a two-point link, thus as a rod link, so that the fork-shaped configuration of the check rail 15*a* and also the large width of the rubber bearing 25 described above and its high bearing stiffness can be avoided on the wheel holder side.

To be able to avoid the fork-shaped design of the check rail 15*a* as well as the additional pendulum support, for example, the rubber bearing 25 of the mounting point 23 has a large width or length extending along the screw axis or in the axial direction of the rubber bearing 25. For example, the above-mentioned high bearing stiffness of the rubber bearing 25, also referred to as cardanic stiffness, can be realized. This applies to all embodiments.

For example, a respective ball joint and/or sliding joint could be used instead of the respective rubber bearing.

LIST OF REFERENCES

1. Vehicle axis
2. Double arrow
3. Vehicle wheel
4. Double arrow
5. Axle support
6. Wheel suspension
7. spring and/or damper element
8. Vibration damper
9. Spring
10. Wheel holder
11. Pivot bearing
12. Rotational axis of rotation
13. Wheel hub
14. Pivot axis
15. *a-e* wheel control arm
16. Mounting point
17. Mounting point
18. Rubber bearing
19. Rubber bearing
20. Rubber bearing
21. Mounting point
22. Mounting point
23. Mounting point
24. Mounting point
25. Rubber bearing
26. Rubber bearing
27. Dot-dash line
28. Fork tine
29. Fork tine
30. Body region
31. Pick-up
32. Partial area
33. Mounting point
34. Rubber bearing
35. Joint
36. Joint
37. Recess
38. Partial area
39. Side shaft
40. Pendulum support
41. Mounting point
42. Mounting point
43. Brake disk
44. Mounting point
45. Mounting point
46. Mounting point
47. Mounting point
48. Mounting point
49. Mounting point
50. Rubber bearing
51. Rubber bearing
52. Mounting point
53. Mounting point
54. Pendulum support
55. Mounting point

The invention claimed is:

1. A wheel suspension for a vehicle wheel of a motor vehicle, the wheel suspension comprising:

a wheel holder;

a pivot bearing, on which the vehicle wheel is rotatably mountable, wherein the pivot bearing is mounted on the wheel holder to be pivotable about a pivot axis relative to the wheel holder to steer the pivot bearing and the vehicle wheel;

at least two check rails coupled in an articulated manner to the wheel holder, the at least two check rails including a first check rail and a second check rail, via which the wheel holder is connectable in an articulated manner to a chassis of the motor vehicle;

a third check rail which is coupled in an articulated manner to the pivot bearing via a connecting element and via which the pivot bearing is pivotable about the pivot axis relative to the wheel holder to steer the pivot bearing and the vehicle wheel; and a spring and/or damper element, via which the wheel holder and the pivot bearing are spring-loadable and/or dampable on a body of the motor vehicle, wherein at least four check rails, including the first check rail, the second check rail, a fourth check rail and a fifth check rail, are coupled in an articulated manner to the wheel holder, and the wheel holder is connectable in an articulated manner to the chassis of the motor vehicle via the at least four check rails.

2. The wheel suspension according to claim 1, wherein the third check rail is coupled in an articulated manner to the pivot bearing via exactly one mounting point comprising the connecting element.

3. The wheel suspension according to claim 2, wherein the second check rail is configured as a four-point rocker, which:

is coupled to the wheel holder in an articulated manner via exactly two first mounting points which are spaced apart from one another; and precisely two second mounting points which are spaced apart from one another and via which the four-point rocker is couplable to the chassis in an articulated manner.

4. The wheel suspension according to claim 2, wherein the second check rail is configured as a three-point rocker, which:

is coupled to the wheel holder in an articulated manner via exactly one first mounting point; and exactly two second mounting points spaced apart from the first mounting point and spaced apart from one another, and via the two second mounting points the three-point rocker is couplable to the chassis in an articulated manner.

5. The wheel suspension according to claim 4, wherein a pendulum support which is coupled in an articulated manner to the three-point rocker via a third mounting point spaced apart from the first mounting point and by the second mounting points and via a fourth mounting point spaced apart from the first mounting point, from the second mounting points and from the third mounting point, to the wheel holder.

6. The wheel suspension according to claim 4, wherein a pendulum support which is coupled in an articulated manner to the wheel holder via a third mounting point spaced apart from the first mounting point and by the second mounting points and via a fourth mounting point spaced apart from the first mounting point, from the second mounting points and from the third mounting point, to the first check rail.

7. The wheel suspension according to claim 2, wherein at least four check rails, including the first check rail, the second check rail, a fourth check rail and a fifth check rail, are coupled in an articulated manner to the wheel holder, and the wheel holder is connectable in an articulated manner to the chassis of the motor vehicle via the at least four check rails.

8. The wheel suspension according to claim 1, wherein the second check rail is designed as a four-point rocker, which:

is coupled to the wheel holder in an articulated manner via exactly two first mounting points which are spaced apart from one another; and precisely two second mounting points which are spaced apart from one another and via which the four-point rocker is couplable to the chassis in an articulated manner.

9. The wheel suspension according to claim 1, wherein the second check rail is configured as a three-point rocker, which:

is coupled to the wheel holder in an articulated manner via exactly one first mounting point; and exactly two second mounting points spaced apart from the first mounting point and spaced apart from one another, and via the two second mounting points the three-point rocker is couplable to the chassis in an articulated manner.

10. The wheel suspension according to claim 9, wherein a pendulum support which is coupled in an articulated manner to the three-point rocker via a third mounting point spaced apart from the first mounting point and by the second mounting points and via a fourth mounting point spaced apart from the first mounting point, from the second mounting points and from the third mounting point, to the wheel holder.

11. The wheel suspension according to claim 10, wherein a second pendulum support which is coupled in an articulated manner to the wheel holder via a fifth mounting point spaced apart from the first mounting point, from the second mounting points, from the third mounting point and from the fourth mounting point, and via a sixth mounting point spaced apart from the first mounting point, from the second mounting points, from the third mounting point, from the fourth mounting point and from the fifth mounting point, to the first check rail.

12. The wheel suspension according to claim 9, wherein a pendulum support which is coupled in an articulated manner to the wheel holder via a third mounting point spaced apart from the first mounting point and by the second mounting points and via a fourth mounting point spaced apart from the first mounting point, from the second mounting points and from the third mounting point, to the first check rail.

13. The wheel suspension according to claim 1, wherein a pendulum support which is coupled to the wheel holder in an articulated manner via a first mounting point and is coupled in an articulated manner to the first check rail, which is spaced apart from the first mounting point, and which is coupled in an articulated manner to another one of the four check rails which are coupled in an articulated manner to the wheel holder.

14. The wheel suspension according to claim 1, wherein:

the second check rail is coupled to the wheel holder in an articulated manner via exactly one third mounting point and has exactly one fourth mounting point which is spaced apart from the third mounting point and via which the second check rail is couplable in an articulated manner to the chassis;

the fourth check rail is coupled to the wheel holder in an articulated manner via exactly one fifth mounting point and has exactly one sixth mounting point which is spaced apart from the fifth mounting point and via which the fourth check rail is couplable in an articulated manner to the chassis; and/or the fifth check rail is coupled to the wheel holder in an articulated manner via precisely one seventh mounting point and has exactly one eighth mounting point which is spaced apart from the seventh mounting point and via which the fifth check rail is couplable in an articulated manner to the chassis.

15. The wheel suspension according to claim 1, wherein the first check rail is coupled to the wheel holder in an articulated manner via precisely one mounting point.

16. The wheel suspension according to claim 15, wherein the mounting point, via which the first check rail is coupled in an articulated manner to the wheel holder, has a second connecting element, which is coupled to the wheel holder or the first check rail via a bearing bolt and, when viewed in a radial direction of the bearing bolt, has a bearing stiffness of at least 40 Newton meters per degree.

17. The wheel suspension according to claim 1, wherein the first check rail is coupled in an articulated manner to the wheel holder via precisely two mounting points spaced apart from one another.

18. The wheel suspension according to claim 1, wherein the pivot bearing is mounted on the wheel holder to be pivotable about the pivot axis relative to the wheel holder via at least one bearing, wherein the pivot bearing has a recess in which the bearing is at least partially arranged, and wherein the wheel holder engages in the recess.

19. A motor vehicle, having at least one multi-link axle, which has at least two wheel suspensions according to claim 1.

* * * * *